(12) United States Patent
Tsukuda et al.

(10) Patent No.: US 7,418,667 B2
(45) Date of Patent: Aug. 26, 2008

(54) CHARACTER INPUT APPARATUS AND TAPE PRINTING APPARATUS INCORPORATING THE SAME AS WELL AS CHARACTER INPUT METHOD

(75) Inventors: Hideyuki Tsukuda, Matsumoto (JP); Tomoki Nakamura, Tokyo (JP); Ko Kojima, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 646 days.

(21) Appl. No.: 10/235,990

(22) Filed: Sep. 5, 2002

(65) Prior Publication Data

US 2003/0110441 A1 Jun. 12, 2003

(30) Foreign Application Priority Data

Sep. 6, 2001 (JP) .............................. 2001-270431

(51) Int. Cl.
*G09G 5/00* (2006.01)
(52) U.S. Cl. ..................................... 715/780; 715/256
(58) Field of Classification Search ................. 715/780, 715/856, 858, 860, 745, 747, 765, 769, 244, 715/245, 253, 271, 256; 358/1.15
See application file for complete search history.

(56) References Cited

U.S. PATENT DOCUMENTS

| | | | | |
|---|---|---|---|---|
| 5,305,394 | A * | 4/1994 | Tanaka ........................ | 382/189 |
| 6,300,967 | B1 * | 10/2001 | Wagner et al. .............. | 715/784 |
| 6,892,355 | B2 * | 5/2005 | Britten et al. ............... | 715/733 |
| 2004/0155869 | A1 * | 8/2004 | Robinson et al. ............ | 345/168 |
| 2005/0125731 | A1 * | 6/2005 | Jurion et al. ................. | 715/536 |

FOREIGN PATENT DOCUMENTS

| | | |
|---|---|---|
| CN | 1184985 | 12/1997 |
| JP | 07-219949 | 8/1995 |
| JP | 09212502 | 8/1997 |
| JP | 09-231205 | 9/1997 |
| JP | 10-166667 | 6/1998 |
| JP | 10187136 | 7/1998 |
| JP | 10240720 | 9/1998 |
| JP | 11-272708 | 10/1999 |

OTHER PUBLICATIONS

Microsoft Internet Explorer, 1995-2001, Figure 1.*
www.maran.com, 1995-96, Figure 2.*
Microsoft Outlook 2000, 1995-99, Figures 3 and 4.*

* cited by examiner

*Primary Examiner*—Steven P Sax
(74) *Attorney, Agent, or Firm*—Hogan & Hartson LLP

(57) ABSTRACT

There are provided a character input apparatus and a tape printing apparatus incorporating the character input apparatus as well as a character input method, which are capable of easily preparing a desired document by calling a design form having a sample text input therein in advance and then editing contents of the sample text. A plurality of design forms each having a sample text input therein in advance are stored, and one design form is selected from the plurality of stored design forms. The sample text of the selected one design form is edited. The sample text of the selected one design form or the edited sample text is displayed on a screen. At the same time, the sample text is also displayed with a cursor added to a character to be edited. In an initial state before editing, the sample text is displayed with the cursor added to a last character thereof.

20 Claims, 20 Drawing Sheets

F I G. 1
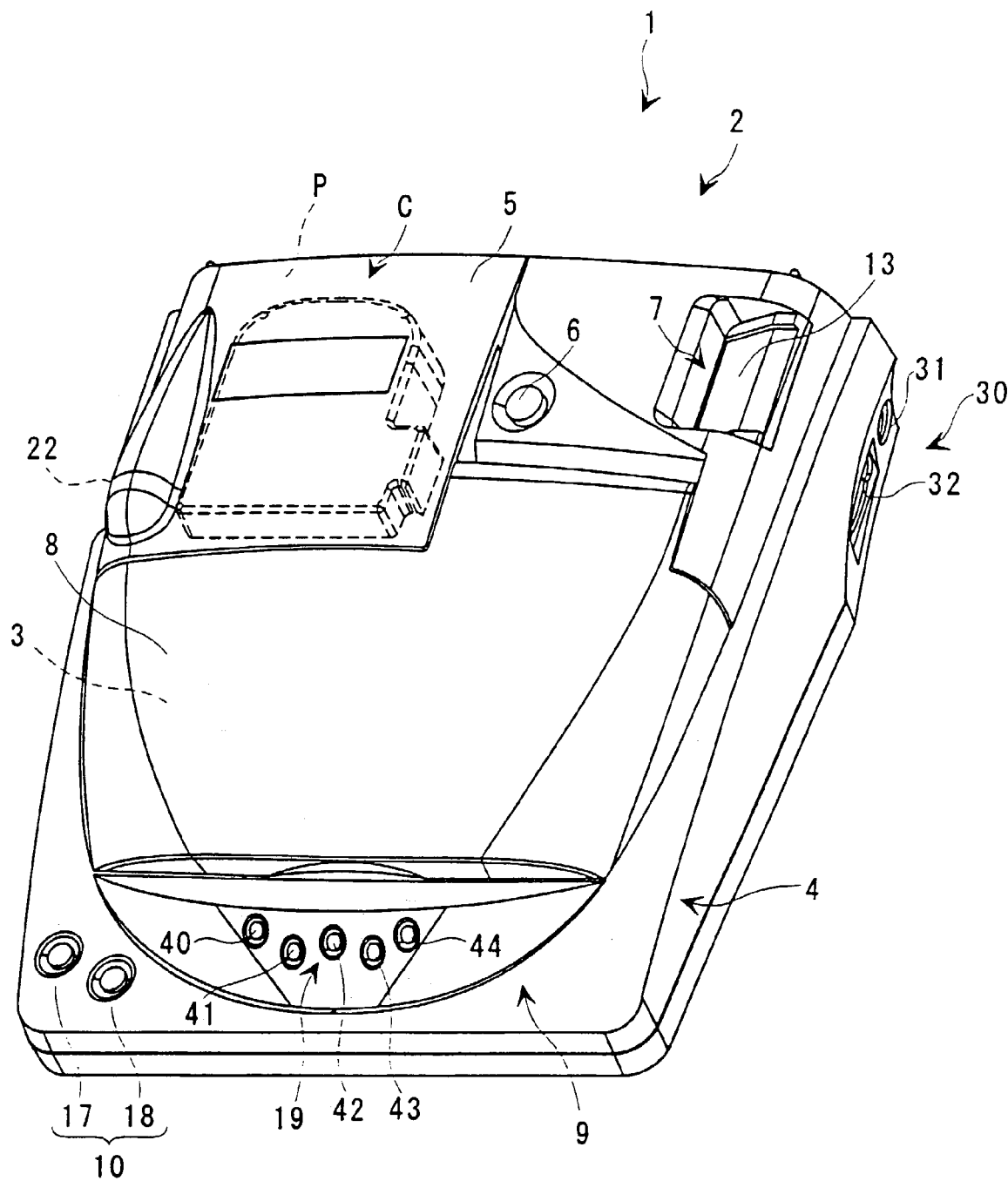

(BEFORE EDITING)

FIG. 6B

⟨FORM INFORMATION⟩

```
FORM: A4 FILE
TEXT FORMAT: FIXED LENGTH PRINTING: LAYOUT(20cm)
        MARGIN: AUTOMATIC/SHORT
PARAGRAPH STYLE FOR ENTIRE TEXT:
        NOT SET(PARARAPH-BY-PARARAPH SETTING)
LETTER MODE FOR ENTIRE TEXT:
        VERTICAL/HORIZONTAL: VERTICAL WRITING
        TYPEFACE: JAPANESE; GOTHIC,
        ALPHANUMERICS; AUTOMATIC
```

PRODUCT PLANNING

MANAGED BY : TECHNICAL DEVELOPMENT DEPT.
ABOLISHMENT DATE: OCT. 31, 2003

FIG. 6C

PARAGRAPH 1

⟨PARAGRAPH INFORMATION⟩

```
PARAGRAPH STYLE: LETTER SIZE: 1 LINE/LARGE 1d
```

FIG. 6D

PARAGRAPH 2

⟨PARAGRAPH INFORMATION⟩

```
PARAGRAPH STYLE:
    LETTER SIZE: 2 LINES/MIDDLE/MIDDLE 2b
        OUTER FRAME/TABULAR FORMAT:
        OUTER FRAM; 3
    REPETITIVE TEXT
        1  MANAGED BY     :
        2  ABOLISHMENT DATE:
```

FIG. 11A

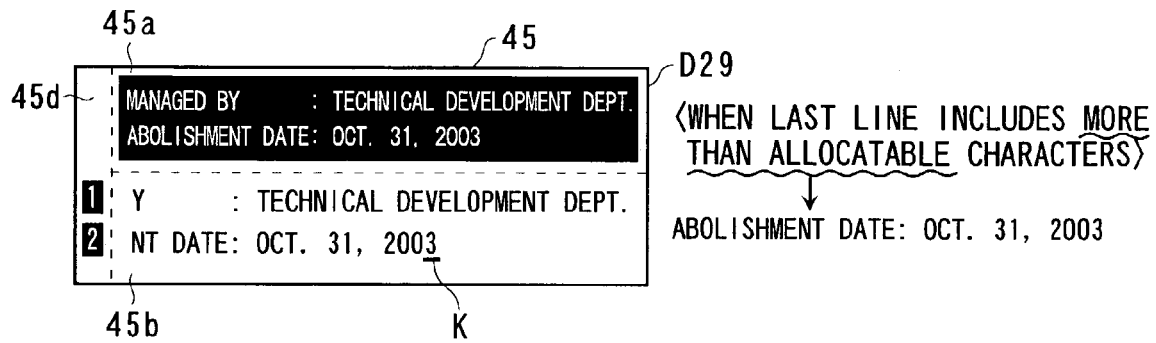

⟨WHEN LAST LINE INCLUDES MORE THAN ALLOCATABLE CHARACTERS⟩

ABOLISHMENT DATE: OCT. 31, 2003

FIG. 11B

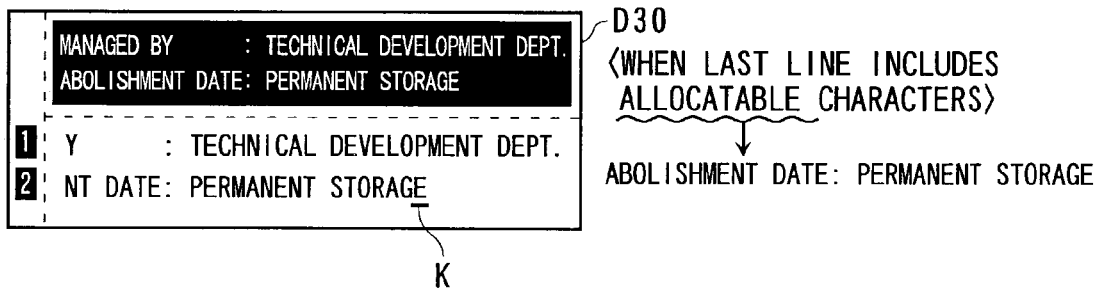

⟨WHEN LAST LINE INCLUDES ALLOCATABLE CHARACTERS⟩

ABOLISHMENT DATE: PERMANENT STORAGE

FIG. 11C

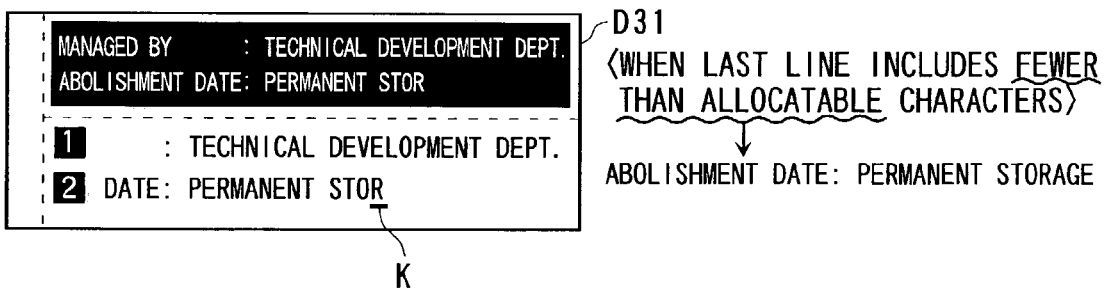

⟨WHEN LAST LINE INCLUDES FEWER THAN ALLOCATABLE CHARACTERS⟩

ABOLISHMENT DATE: PERMANENT STORAGE

FIG. 11D

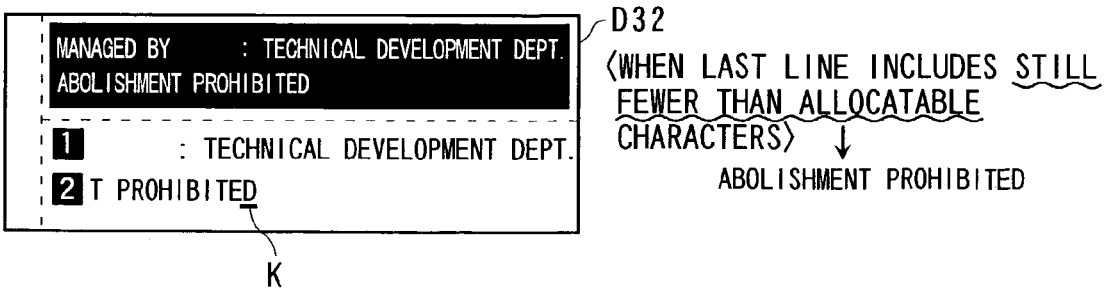

⟨WHEN LAST LINE INCLUDES STILL FEWER THAN ALLOCATABLE CHARACTERS⟩

ABOLISHMENT PROHIBITED (BEFORE EDITING) FIG. 12A FIXTURE MANAGEMENT SLIP

| FIXTURE NAME | DIGITAL CAMERA AV-100 |
|---|---|
| MANAGEMENT NO. | X003 |
| PURCHASED DATE | DEC. 2002 |
| MANAGED BY | TECHNICAL DEVELOPMENT DEPT. |

_____/\_____/
PARAGRAPH 1      PARAGRAPH 2

⟨FORM INFORMATION⟩ FIG. 12B

```
FORM: FIXTURE MANAGEMENT SLIP
TEXT FORMAT: MARGIN: AUTOMATIC/SHORT
PARAGRAPH STYLE FOR ENTIRE TEXT: LETTER SIZE; AUTOMATIC/UNIFORM
                                 LAYOUT: FORWARD ALIGNMENT
                                 OUTER FRAME/TABULAR FORMAT:
                                            TABULAR FORMAT; 03
LETTER MODE FOR ENTIRE TEXT: VERTICAL/HORIZONTAL: HORIZONTAL WRITING
                             TYPEFACE: JAPANESE; BOLD-MINCHO,
                             ALPHANUMERICS; AUTOMATIC
```

PARAGRAPH 1
⟨PARAGRAPH INFORMATION⟩ FIG. 12C

| PARAGRAPH STYLE: LAYOUT; LAYOUT [REPETITIVE TEXT] | LETTER MODE: TYPEFACE: JAPANESE; GOTHIC, ALPHANUMERICS; AUTOMATIC |

1 ▶ FIXTURE NAME
2 ▶ MANAGEMENT NO.
3 ▶ PURCHASED DATE
4 ▶ MANAGED BY
   M

PARAGRAPH 2
⟨PARAGRAPH INFORMATION⟩ FIG. 12D

| NOT SET |

F I G. 1 4
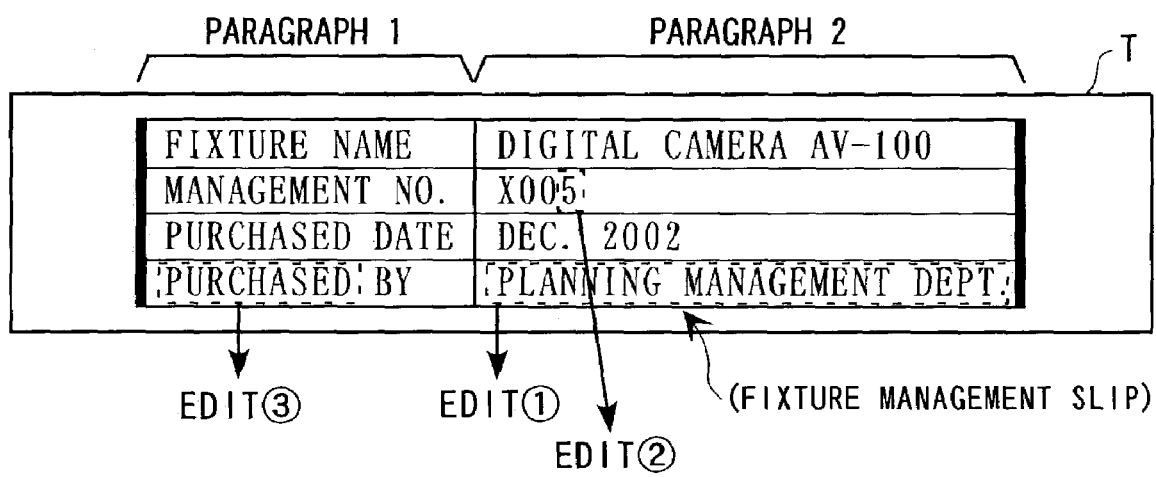

FIG. 15

TEXT FORMAT

| MENU | FIRST OPTION | SECOND OPTION |
|---|---|---|
| BACKGROUND PATTERN PRINTING | NOT SET 00<br>WAVE 01<br>RHOMBUS 02<br>DIAPER 03<br>SNOW 04<br>CHERRY BLOSSOM 05<br>STAR 06<br>CARDS 07<br>ARABESQUE 08<br>HALFTONE 09<br>DOT 10 | |
| | CHARACTER BACKGROUND PATTERN 11 | |
| | ORIGINAL 12<br>ORIGINAL 13<br>ORIGINAL 14<br>ORIGINAL 15 | ORIGINAL BACKGROUND PATTERN<br><br>SMALL PATTERN<br>LARGE PATTERN |
| FIXED LENGTH PRINTING | MD<br>MUSIC TAPE<br>MINI DV<br>8 mm VIDEOTAPE<br>VHS<br>FD/MO<br>B5 FILE ⎯S11<br>A4 FILE | FORWARD ALIGNMENT<br>CENTER ALIGNMENT<br>LAYOUT<br>BACKWARD ALIGNMENT<br>S11 |
| | NOT SET | |
| | 1.0cm<br>:<br>95cm | FORWARD ALIGNMENT<br>CENTER ALIGNMENT<br>LAYOUT<br>BACKWARD ALIGNMENT |
| MARGIN | AUTOMATIC/SHORT<br>AUTOMATIC/LONG<br>VERY SHORT<br>SHORT<br>NORMAL<br>LONG | S12,<br>S20 |

PARAGRAPH STYLE   FIG. 16

| MENU | FIRST OPTION | SECOND OPTION |
|---|---|---|
| LETTER SIZE | AUTOMATIC | UNIFORM —S21<br>EASY |
| | 1 Line | THIN 1a   MIDDLE 1c   EXTRA-LARGE 1e<br>SMALL 1b   LARGE 1d —S16 |
| | 2 Lines | FREE & FLEXIBLE<br>LARGE/LARGE 2a   LARGE/MIDDLE 2c<br>MIDDLE/MIDDLE 2b   SMALL/LARGE 2d |
| | 3 Lines | FREE & FLEXIBLE   —S17<br>UNIFORM 3a   2nd LARGE 3c<br>1st LARGE 3b   3rd LARGE 3d |
| | 4 Lines | FREE & FLEXIBLE<br>UNIFORM 4a   2nd LARGE 4c   4th LARGE 4e<br>1st LARGE 4b   3rd LARGE 4d |
| | 5 Lines | FREE & FLEXIBLE<br>UNIFORM 5a   2nd LARGE 5c   4th LARGE 5e<br>1st LARGE 5b   3rd LARGE 5d   5th LARGE 5f |
| | 6 Lines | FREE & FLEXIBLE<br>UNIFORM 6a   BOTTOM LARGE 6c<br>TOP LARGE 6b |
| | 7 to 13 Lines | |
| LAYOUT | FORWARD ALIGNMENT —S22<br>CENTER ALIGNMENT<br>LAYOUT —S27<br>BACKWARD ALIGNMENT | |
| | NOT SET | |
| | TABULAR FORMAT | 01   04   07   10<br>02   05   08<br>S23— 03   06   09 |
| OUTER FRAME/ TABULAR FORMAT S18 | 01  08  15  22  29  36  43  50<br>02  09  16  23  30  37  44  51<br>03  10  17  24  31  38  45  52<br>04  11  18  25  32  39  46  53<br>05  12  19  26  33  40  47<br>06  13  20  27  34  41  48<br>07  14  21  28  35  42  49 | |

F I G. 1 7

LETTER MODE

| NEMU | FIRST OPTION | SECOND OPTION | |
|---|---|---|---|
| VERTICAL/ HORIZONTAL | VERTICAL WRITING — S13<br>HORIZONAL WRITING — S24 | | S15, S26, S29 |
| TYPEFACE<br><br>S14, S28<br><br>S25 | JAPANESE TYPEFACE<br>MINCHO   HOLLOW MINCHO<br>GOTHIC   HOLLOW GOTHIC<br>BOLD-MINCHO<br>BOLD-GOTHIC<br>EXTRA BOLD-MINCHO<br>EXTRA BOLD-GOTHIC | ALPHANUMERIC TYPEFACE<br>AUTOMATIC  BOLD-HV    ROUND GOTHIC<br>MINCHO    BOLD-BR<br>GOTHIC    EXTRA BOLD-MINCHO<br>HV        EXTRA BOLD-GOTHIC<br>BR        EXTRA BOLD-HV<br>BOLD-MINCHO EXTRA BOLD-BR<br>BOLD-GOTHIC ROUND MINCHO | |
| DECORATED LETTER | A WHITE<br>A HALF TONE<br>A STANDARD<br>A SHADED<br>A HOLLOW & SHADED | A ITALICIZED<br>A NORMAL<br>A HIGHLIGHTED<br>A ITALICIZED & HIGHLIGHTED | |
| EXPANSION/ CONTRACTION | A FINE<br>A SMALL | AA CENTER ALIGNMENT<br>AA UNDERSIDE ALIGNMENT | |
| | A NORMAL<br>A CONTRACT<br>A EXPAND | | |
| ENCLOSING/ SHADING | ≠ CORRECTION LINE  Ⓐ CIRCLING<br>A UNDERLINING   Ⓐ SHADING<br>A NOT SET      Ⓐ BOXING & SHADING<br>Ⓐ BOXING       Ⓐ CIRCLING & SHADING | | |
| SPACE BETWEEN LETTERS | CLOSE<br>NARROW<br>NORMAL<br>WIDE | PITCH/AUTOMATIC | |
| | | PITCH/FIXED | |

FIG. 18A
[EXAMPLE 1: VHS/HORIZONAL] (LABEL TO BE PRODUCED)
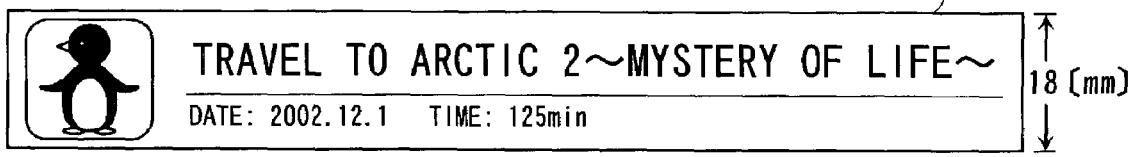
(TEXT CONTENTS)
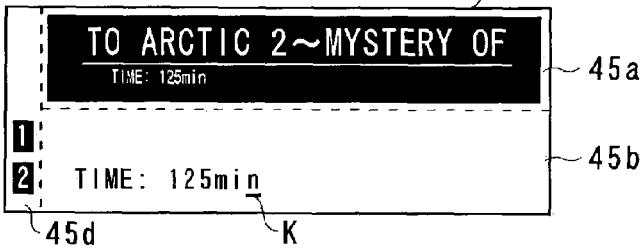
(INITIAL SCREEN)
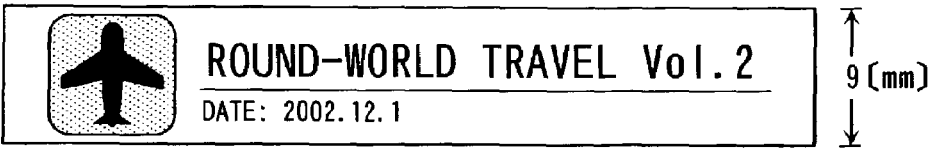
FIG. 18B
[EXAMPLE 2: 8 mm VIDEO CASSETTE] (LABEL TO BE PRODUCED)
(TEXT CONTENTS)
(INITIAL SCREEN)
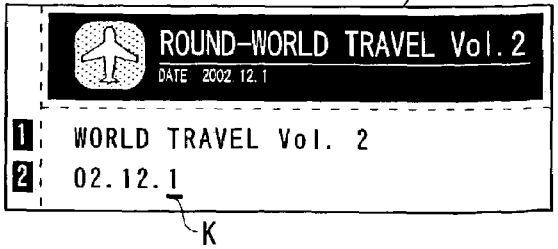

FIG. 19A
[EXAMPLE 3: MINI DV] (LABEL TO BE PRODUCED)
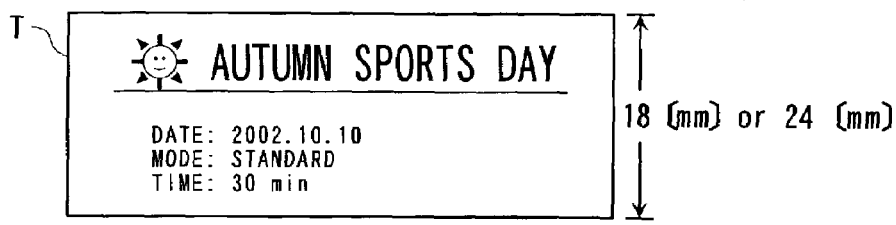
(TEXT CONTENTS)
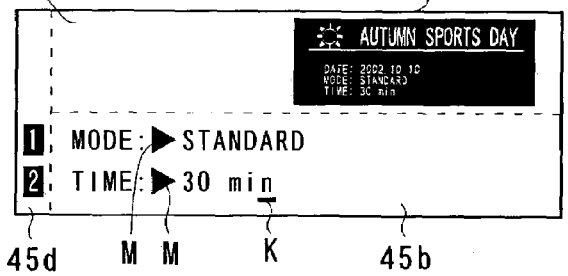
(INITIAL SCREEN)
FIG. 19B
[EXAMPLE 4: DAT] (LABEL TO BE PRODUCED)
(TEXT CONTENTS)
(INITIAL SCREEN)
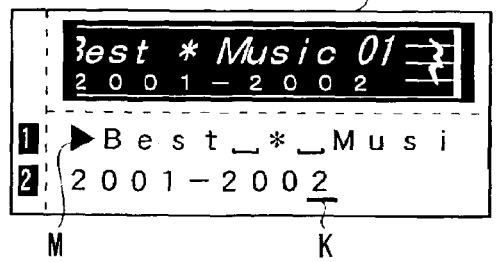

[PURCHASER INFORMATION], [↓], [02.10.01-12.31]

[↓], [MANAGING DEPT.]

CHARACTER INPUT APPARATUS AND TAPE PRINTING APPARATUS INCORPORATING THE SAME AS WELL AS CHARACTER INPUT METHOD

BACKGROUND OF THE INVENTION

1. Field of the Invention

This invention relates to a character input apparatus which is capable of calling a design form having a sample text input in advance therein and then editing contents of the sample text, and a tape printing apparatus incorporating the character input apparatus as well as to a character input method.

1. Prior Art

Recently, there has been proposed a character input apparatus (such as a word processor) that stores in advance design forms (templates) prepared assuming various uses, and enables a user to readily and easily prepare a document which meets the user's needs by calling a design form according to an intended use and inputting required data items into the same. Further, a tape printing apparatus is also widely used which stores a plurality of design forms and enables a user to produce various labels according to uses intended by users.

In the tape printing apparatus of the above-mentioned kind, e.g. in a process of making a label to be affixed to such a floppy disk as shown in FIG. 20A, a user selects a design form intended for the floppy disk and then causes an entered form illustrated e.g. in FIG. 20B to be displayed on a display screen. In this example, an upper area of the screen is allocated to a print image display section for displaying an image to be printed on a tape, and a lower area of the same is allocated to a text display section for displaying an edited state of an entered text. Text entry is started at a location immediately after a cursor K ("L" (short for letter) mark) displayed in the text display section. A numeral in white against black at the head of each line represents the line number of a character string, and a triangle mark displayed in white against black on the right side of the numeral, with one of its vertexes directed rightward, indicates that a specific format is set for the line.

In a state shown in FIG. 20B, the user operates a keyboard and the like while viewing a image displayed on the screen, to enter desired characters, such as letters and symbols (see FIG. 20C). Then, after entry of all character strings (three strings in this example) (see FIG. 20D), a printing process is executed, whereby it is possible to make a label having a predetermined size suitable for affixation to the floppy disk. In this case, the label size (tape length) is preset as shown in FIG. 20A, and hence the user can obtain a nice-looking label with ease without carrying out troublesome setting of the tape length.

However, when a design form is called for label making, no text is displayed in the print image display section at a stage of FIG. 20B before text entry, so that the user cannot obtain a print image of a character or a character string until the character or the character string is entered. In short, the user is given no idea of what text should be entered or where a text should be entered. Therefore, the user has to enter a character or a character string on a trial basis to view a print image thereof in the print image display section, and then retry character input when the result of the text input is not pleasing, or alternatively carry out character input while viewing samples of text entry to the design form e.g. by consulting an instruction manual.

SUMMARY OF THE INVENTION

It is an object of the invention to provide a character input apparatus and a tape printing apparatus incorporating the character input apparatus as well as a character input method, which are capable of easily preparing a desired document by calling a design form having a sample text input therein in advance and then editing contents of the sample text.

To attain the above object, according to a first aspect of the invention, there is provided a character input apparatus comprising:

storage means for storing a plurality of design forms in each of which a sample text formed of one or more character strings has been input in advance;

selection means for selecting one design form from the plurality of design forms stored in the storage means;

edit means for editing the sample text of the one design form selected by the selection means; and display means for displaying the sample text of the one design form selected by the selection means or the edited sample text on a screen, and at the same time also displaying a cursor in a manner added to a character to be edited, wherein the display means displays the cursor in a manner added to a last character of the sample text in an initial state before editing by the edit means.

Further, according to a second aspect of the invention, there is provided a character input method comprising the steps of:

storing a plurality of design forms in each of which a sample text formed of one or more character strings has been input in advance;

selecting one design form from the plurality of design forms stored in the storing step;

editing the sample text of the one design form selected in the selecting step; and displaying the sample text of the one design form selected in the selecting step or the edited sample text on a screen, and at the same time also displaying a cursor in a manner added to a character to be edited;

wherein the displaying step includes displaying the cursor in a manner added to a last character of the sample text in an initial state before editing in the editing step.

According to these first and second aspects of the invention, since a plurality of design forms are stored, and it is possible to select one design form from the stored design forms, the user can easily and readily prepare a document suitable for an intended use. Further, since each design form has a sample text input therein in advance, and the sample text is editable, the user can grasp what characters to enter and where to enter these and then edit the sample text. Moreover, since it is only required to edit one or more portions of the sample text input in advance, which need rewriting and/or complementing, an intended document can be prepared with ease. Furthermore, in an initial state before editing, the cursor is added to the last character of the sample text, so that the user can immediately confirm a portion to be edited and speedily carry out operations for deleting a character or a character string of the sample text input in advance. More specifically, without using both the function of deleting a character immediately before a character to which the cursor is added and the function of deleing a character on or immediately after the cursor, but deleting operations can be speedily carried out only by the former function.

Preferably, the edit means is capable of editing the sample text without using a deletion function for deleting a character positioned immediately after the character to which the cursor is added.

Preferably, the editing step is capable of editing the sample text without using a deletion function for deleting a character positioned immediately after the character to which the cursor is added.

According to these preferred embodiments, since it is possible to edit the sample text input in advance without using the deletion function, the character input apparatus is not required to be equipped with the deletion function for deleting operations, which makes it possible to simplify the control system of the character input apparatus.

Preferably, each sample text has a format set thereto, and a character input for editing by the edit means has a form thereof determined in accordance with the format of the sample text.

Preferably, each sample text has a format set thereto, and a character input for editing in the editing step has a form thereof determined in accordance with the format of the sample text.

According to these preferred embodiments, since each sample text is pre-formatted, and the form of each entered character is determined in accordance with the format of a sample text to be edited, the user can prepare a nice-looking document without any need to perform troublesome operations for formatting. It should be noted that the "format" includes a letter size, a typeface (Courier, Times New Roman, Mincho, Gothic, etc.), the length or space between characters, a decorated character (a shadowed character, a hollow character, and the like), decoration (hatching, background patterning, underlining, outlining, boxing, etc.), and so forth.

Preferably, the sample text includes paragraphs each formed of one or more of the character strings, each of the paragraphs having a format set thereto, and a character input for editing by the edit means has a form thereof determined in accordance with the format of the paragraph to be edited.

Preferably, the sample text includes paragraphs each formed of one or more of the character strings, each of the paragraphs having a format set thereto, and a character input for editing in the editing step has a form thereof determined in accordance with the format of the paragraph to be edited.

According to these preferred embodiments, since paragraphs each formed of one or more character strings are pre-formatted one by one, and the form of a character entered for editing of any one of the paragraphs is determined in accordance with the format of the paragraph to be edited, the user can prepare a nice-looking document without any need to perform troublesome operations for formatting.

Preferably, each character string has a format set thereto, and a character input for editing by the edit means has a form thereof determined in accordance with the format of the character string to be edited.

Preferably, each character string has a format set thereto, and a character entered for editing of any one of the character strings in the step of editing the sample text has a form thereof determined in accordance with the format of the character string to be edited.

According to these preferred embodiments, since each character string has a format set thereto, and the form of a character entered for editing of any one of the character strings is determined in accordance with the format of the character string to be edited, the user can prepare a nice-looking document without any need for performing troublesome operations for formatting.

Preferably, when a format other than a predetermined format is set for any one of the character strings, the display means displays a predetermined mark at a head of the character string having the format other than the predetermined format.

Preferably, when a format other than a predetermined format is set for any one of the character strings, the editing step includes displaying a predetermined mark at a head of the character string having the format other than the predetermined format.

According to these preferred embodiments, since when a format other than the predetermined format is set for any one of the character strings, the predetermined mark is displayed at the head of the character string having the format other than the predetermined format, the user can confirm by the mark that the special format (format other than the predetermined format) is set for the character string.

Preferably, the display means displays information of a format of a character string including the character to which the cursor is added.

Preferably, the displaying step includes displaying information of a format of a character string including the character to which the cursor is added.

According to these preferred embodiments, since the information of the format of the character string including the character to which the cursor is added is displayed, it is possible not only to confirm that the special format (format other than the predetermined format) is set for the character string, but also to view the contents of the character string, so that the user can grasp the image of a document to be prepared.

Preferably, the character input apparatus further comprises indicators for indicating the information of the format.

In the character input method, it is preferred that the information of the format is indicated by indicators.

According to the preferred embodiments, since the information of the format is indicated by the indicators, it is possible to confirm the contents of the format information at a glance. Further, an area for displaying the format information is not required to be so large, and hence it is possible to reduce the size of a screen as the display means.

Preferably, the character input apparatus further comprises input-disabling means for disabling inputting of a character beyond a character area set for each character string for allowing characters to be input thereto.

According to this preferred embodiment, since entry of a character beyond the character range is disabled, it is possible to prevent the user from performing useless character input.

More preferably, the character input apparatus further comprises error notification means for executing error notification when inputting of a character is disabled by the input-disabling means.

According to this preferred embodiment, since error notification is executed when character input is disabled by the input-disabling means, it is possible to make the user clearly aware that useless character input is being performed. It should be noted that the "error notification" may be executed by displaying a warning message on the display screen or by temporarily inhibiting the display screen from displaying any image. Alternatively, an electronic sound (beep) may be used for the purpose.

To attain the above object, according to a third aspect of the invention, there is provided a tape printing apparatus comprising:

a character input apparatus including:

storage means for storing a plurality of design forms in each of which a sample text formed of one or more character strings has been input in advance, selection means for selecting one design form from the plurality of design forms stored in the storage means, edit means for editing the sample text of the one design form selected by the selection means, and display means for displaying the sample text of the one design form selected by the selection means or the edited sample text on a screen, and at the same time also displaying a cursor in a manner added to a character to be edited, the display means displaying the cursor in a manner added to a last character of the sample text in an initial state before editing by the edit means; and printing means for printing on a tape a design form to which an original text prepared by editing the sample text by the edit means has been input.

According to this tape printing apparatus, since the design form including the original text prepared by editing the sample text can be printed on the tape, it is possible to easily produce a tape strip (label) that meets the user's intended use.

Preferably, the printing means is capable of sample printing for printing the design form to which the sample text before editing has been input, on the tape.

According to this preferred embodiment, since sample printing can be carried out before the sample text is edited, it is possible to confirm the printing form of the design form without consulting an instruction manual.

Preferably, the display means is capable of print image display for displaying an image of the design form to be printed by the printing means.

According to this preferred embodiment, since the image of a design form to be printed by the printing means can be displayed, it is possible to confirm the printing form of the design form without consulting an instruction manual.

Preferably, the display means includes a print image display section for the print image display and a text display section for displaying an edited state of the sample text.

According to this preferred embodiment, since the display screen is divided into the print image display section for the print image display and the text display section for displaying the edited state of the sample text, the user can edit the sample text while confirming the print image.

The above and other objects, features, and advantages of the invention will become more apparent from the following detailed description taken in conjunction with the accompanying drawings.

BRIEF DESCRIPTION OF THE DRAWINGS

FIG. 1 is a perspective view of the appearance of a tape printing apparatus according to an embodiment of the invention;

FIGS. 6A to 6D are diagrams useful in explaining an example of a design form (before editing) according to a first example of the invention;

FIGS. 11A to 11D are diagrams useful in explaining how display changes as the number of characters of the last line of a sample text changes;

FIGS. 12A to 12D are diagrams useful in explaining an example of a design form (before editing) according to a second example of the invention;

FIG. 14 is a diagram useful in explaining an example of the design form (after editing) according to the second example of the invention;

FIG. 15 is a diagram illustrating a list of menu options selectable for setting a "text form";

FIG. 16 is a diagram illustrating a list of menu options selectable for setting a "paragraph style";

FIG. 17 is a diagram illustrating a list of menu options selectable for setting a "letter mode";

FIGS. 18A and 18B are diagrams useful in explaining other examples of design forms;

FIGS. 19A and 19B are diagrams useful in explaining still other examples of design forms.

DETAILED DESCRIPTION OF A PREFERRED EMBODIMENT

The invention will now be described in detail with reference to the drawings showing a tape printing apparatus incorporating a character input apparatus according to an embodiment thereof. The tape printing apparatus of the invention is capable of easily producing a nice-looking label suitable for an intended use by calling a design form having a sample text input therein in advance and then editing the contents of the sample text.

Figure 2:
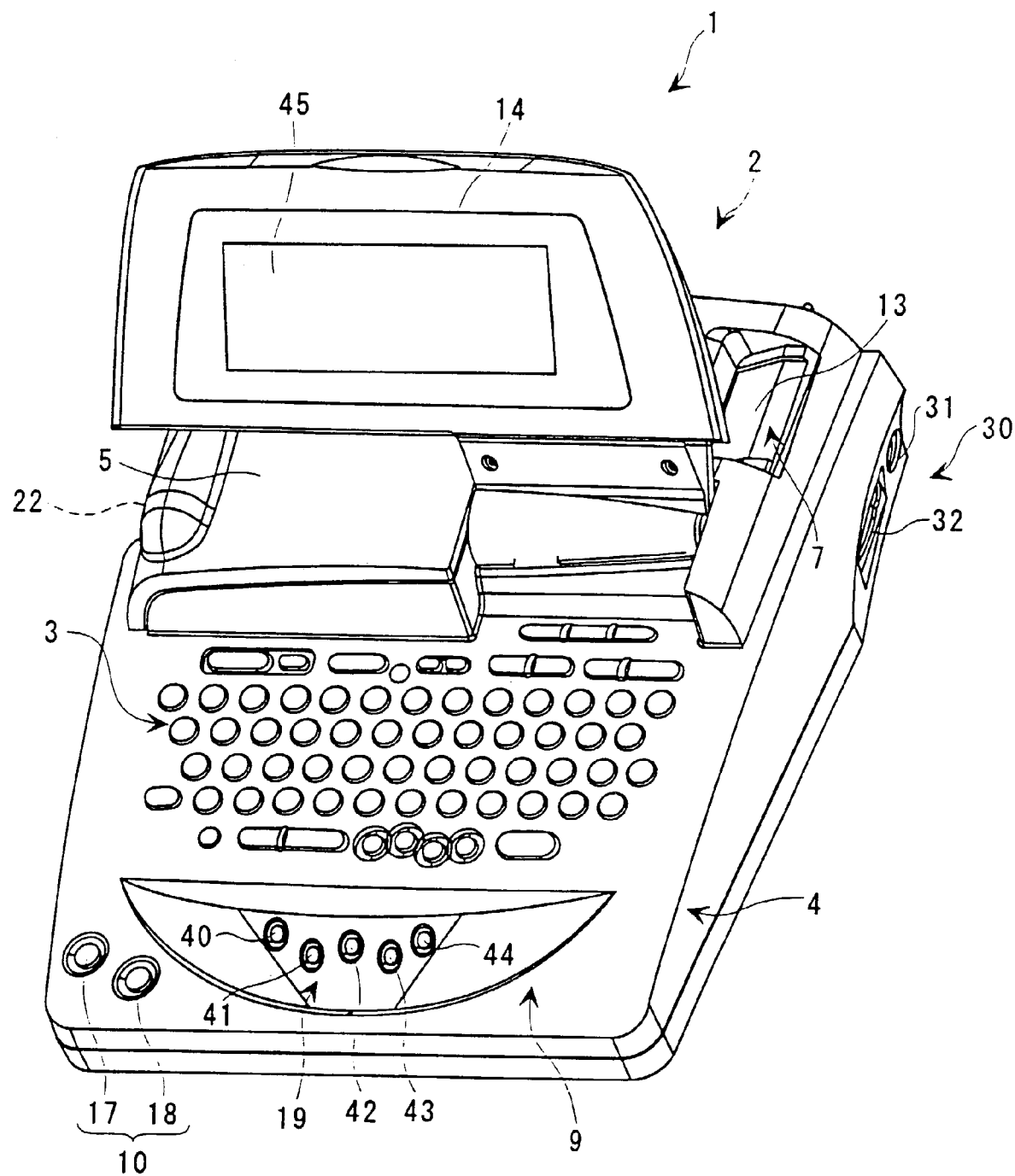
FIG. 2 is a perspective view of the appearance of the FIG. 1 tape printing apparatus with a cover assembly thereof open.

First, a description will be given of the arrangement of the tape printing apparatus 1. FIG. 1 shows the appearance of the whole tape printing apparatus 1 according to the present embodiment. FIG. 2 shows the tape printing apparatus 1 with a cover assembly 8 thereof open, while FIG. 3 shows the apparatus 1 with the cover assembly 8 thereof closed, and with a lid 5 thereof open and a tape cartridge C mounted therein.

Figure 3:
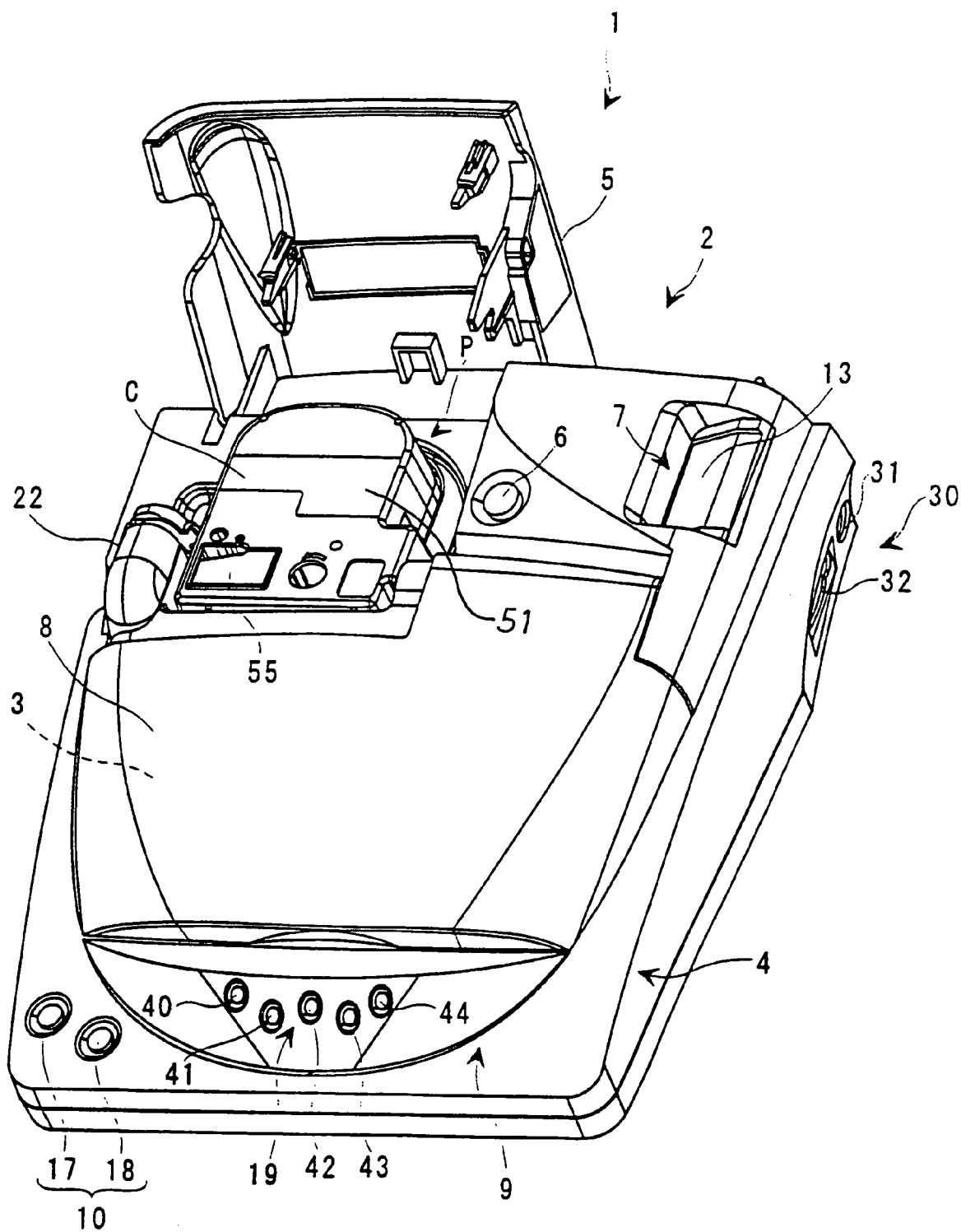
FIG. 3 is a perspective view of the appearance of the FIG. 1 tape printing apparatus with the cover assembly thereof closed, and with a lid thereof open and a tape cartridge mounted therein.

As shown in FIGS. 1 to 3, the tape printing apparatus 1 is comprised of a main unit 2 having an apparatus casing 4 forming an outer shell thereof, and the tape cartridge C removably mounted in the main unit 2. The main unit 2 is comprised of the lid 5 formed with a window, which is attached to the top of the rear left-hand portion of the apparatus casing 4, a lid-opening button 6 arranged at a location adjacent to the right-hand side of the lid 5, for opening and closing the lid 5, a trimming device 7 arranged in the top of the apparatus casing 4 at a location rightward of the lid-opening button 6, the cover assembly 8 including a display 14 and mounted to the central portion of the apparatus casing 4 such that the cover assembly 8 can be opened and closed, and a crescent-shaped block 9 including an exposed lamp group 19 and raised upward from the apparatus casing 4 at a location forward of the cover assembly 8. Further, an exposed key group 10 comprised of two keys is arranged in the top of the apparatus casing 4 at a location leftward of the crescent-shaped block 9, and a keyboard 3 which is covered by the cover assembly 8 when the cover assembly 8 is closed and exposed when the cover assembly 8 is opened is arranged in the same plane where the exposed key group 10 is arranged. Under the lid 5, there is formed a compartment P in which the tape cartridge C is removably mounted.

As shown in FIGS. 1 to 3, according to the tape printing apparatus 1, a user opens the lid 5 by operating the lid-opening button 6, mounts the tape cartridge C in the compartment P, opens the cover assembly 8 to thereby make the keyboard 3 accessible for key entry, and then operates the keyboard 3 while viewing the display 14 (display screen 45). When the user enters printing information, such as desired characters (letters, numerals, symbols, simple figures, etc.) and instructs the apparatus 1 to perform a printing operation via the keyboard 3, a tape T is unwound from the tape cartridge C, and desired printing is conducted on the tape T by a print head 122. The printed portion of the tape T is sent out via a tape exit 22 as the printing proceeds. When the desired printing is completed, the tape T is further advanced to a position corresponding to termination of a tape length (length of a label to be formed) including the length of margins, and then the feeding of the tape is stopped, followed by the portion of the tape T sent out being cut off with a tape cutter 132 arranged at the tape exit 22.

The corners of the cut-off strip of the tape T thus formed can be trimmed by the trimming device 7. More specifically, the user inserts the tape T into a slit of the trimming device 7 along a tape-inserting guide 13 sloped inwardly downward from the top of the apparatus casing 4, and a trimming mechanism of the device 7 automatically operates to trim the corners of the cut-off strip of the printing tape T into ones with a radius.

The tape T is comprised of an image-receiving layer, not shown, as a printing surface, an adhesive layer, not shown, coated on the underside surface of the image-receiving layer, and a peel layer, not shown, peelably covering the underside surface of the adhesive layer. The tape T and an ink ribbon are fed or run such that they pass by a through hole 55, in a state lying one upon the other. Then, the tape T alone is delivered out of the tape cartridge C, whereas the ink ribbon is taken up into a roll within the tape cartridge C. From the tape T (printed portion thereof cut off as described above) delivered out of the apparatus, the peel layer is peeled off, and then the tape T is affixed to an object article. It should be noted that in the tape printing apparatus 1, a single-layer tape T (i.e. without the adhesive layer and the peel layer) can also be used.

The tape printing apparatus 1 is capable of printing data entered and edited by a personal computer on a tape T by connecting between the main unit 2 and the personal computer with a cable. The tape printing apparatus 1 and the personal computer are placed in a communicative connection wait state by connecting between the main unit 2 and the personal computer with the cable, and the communicative connection wait state can be switched to a communicative connection-enabled state by turning on a communication input key 18. Further, since a connection terminal block 30 comprised of an AC adapter connector port 31 into which a plug of a cord of an AC adapter, not shown, is inserted and a data input port 32 into which a connector, not shown, of the cable is inserted is arranged on the side opposite to the tape exit 22 in the apparatus casing 4, the cable and the cord of the AC adapter, which are connected to the main unit 2, do not obstruct or interfere with picking up of a dispensed cut-off strip of the tape T. The tape printing apparatus 1 is capable of printing print data entered by the personal computer on the tape T even when the apparatus is in an upright position with the rear surface thereof directed downward and serving as the bottom of the apparatus.

It should be noted that when the tape printing apparatus 1 is communicatively connected to the personal computer as described above, it is not required to use the keyboard 3, and hence the keyboard 3 may be covered by the cover assembly 8 as shown in FIG. 1.

The exposed lamp group 19 is comprised of a plurality of indicator lamps arranged in the central portion of the crescent-shaped block 9. More specifically, the indicator lamps include a printing indicator lamp 40, a power supply indicator lamp 41, an automatic cutting indicator lamp 42, a communication indicator lamp 43, and a trimming indicator lamp 44 arranged in the mentioned order from the left as viewed in FIGS. 1 to 3, and each indicator lamp is lighted (turned on) and extinguished (turned off) according to corresponding operating states of the apparatus 1. The printing indicator lamp 40 is on when the tape T is being subjected to printing and a printed portion of the tape T is being cut off, while the automatic cutting indicator lamp 42 is on when the function of cutting the tape T not manually but automatically is set. The communication indicator lamp 43 is on when the communication input key 18, referred to hereinafter, has been turned on. The trimming indicator lamp 44 is on during cutting and shaping of corners of a printed strip of the tape T by the trimming device 7.

The exposed key group 10 is comprised of a power key 17 and the communication input key 18 arranged immediately adjacent to each other on the respective left-hand side and the right-hand side. The power key 17 turns on and off the power of the main unit 2, while the communication input key 18 enables and disables communicative connection between the apparatus 1 and the personal computer.

Figure 4:
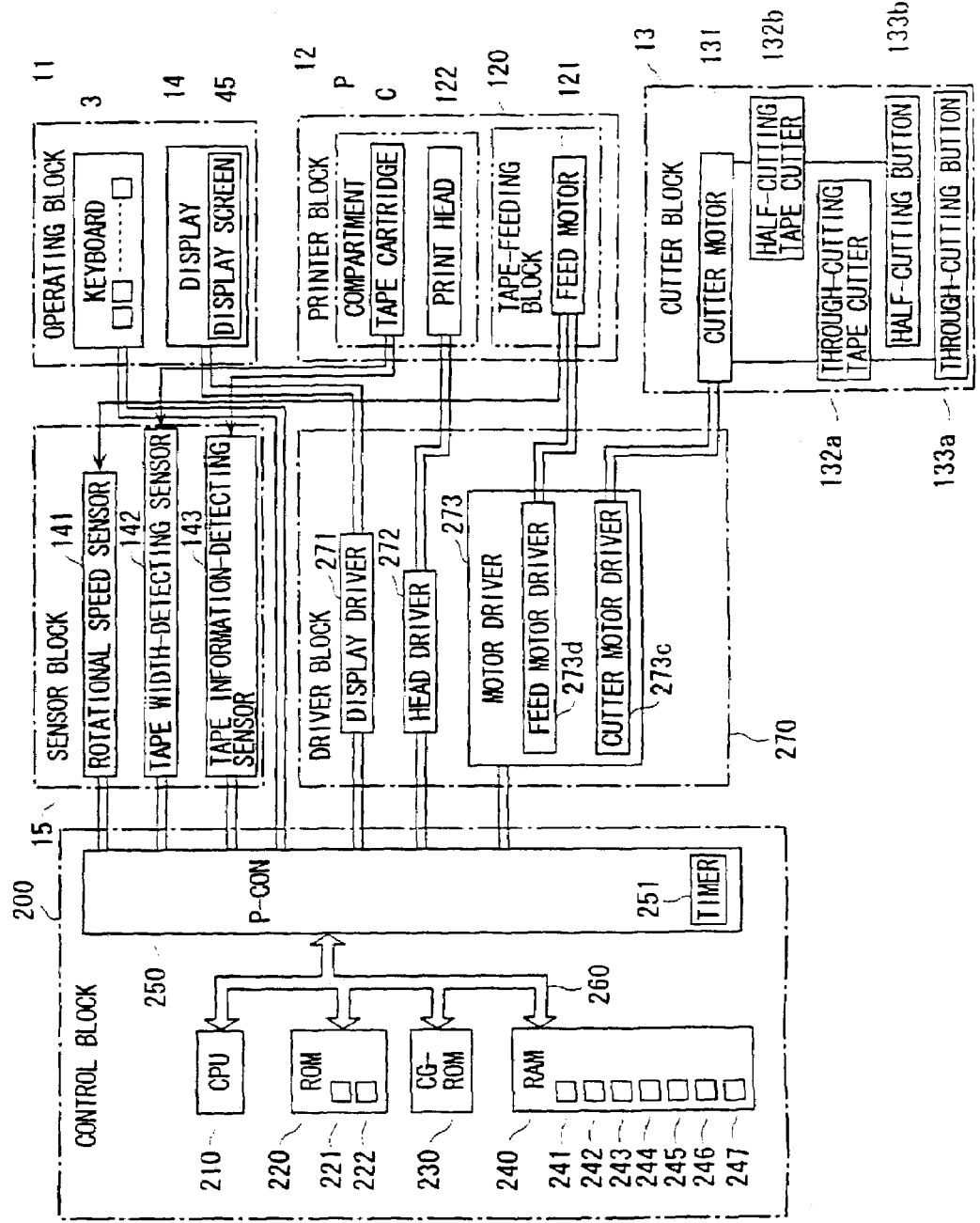
FIG. 4 is a block diagram showing the arrangement of a control system of the FIG. 1 tape printing apparatus.

Next, the basic arrangement of the control system of the printing apparatus 1 will be described. As shown in FIG. 4, the tape printing apparatus 1 is basically comprised of an operating block 11 having the keyboard 3 and the display 14 and interfacing with the user, a printer block 12 having a print head (thermal head) 122 and a tape feeder block 120 and performing printing on the tape T unwound from the tape cartridge C, a cutter block 13 for cutting off the printed portion of the tape T, a sensor block 15 having various sensors for carrying out various detecting operations, a driver block 270 having drivers for driving circuits of various devices, and a control block 200 for controlling operations of components of the tape printing apparatus 1. To implement this construction of the present embodiment, the apparatus casing 4 accommodates a circuit board, not shown, in addition to the printer block 12, the cutter block 13, the sensor block 15 and so forth. On the circuit board, there are mounted a power supply unit, not shown, the circuits of the driver block 270 and the control block 200, etc. The power supply unit is connected to the AC adapter port 31, and batteries, not shown, such as nicad batteries, which can be removably mounted in the main unit 2 from the outside thereof.

The operating block 11 is comprised of the keyboard 3 and the display 14. The display 14 has a display screen 45 which is capable of displaying display image data of 198 dots in the horizontal direction (X direction) by 64 dots in the vertical direction (Y direction) (see FIG. 5), and used by the user when he enters data via the keyboard 3 to form or edit print image data, views the resulting data, and enters various commands including ones for selecting menu options via the keyboard 3.

Figure 5:
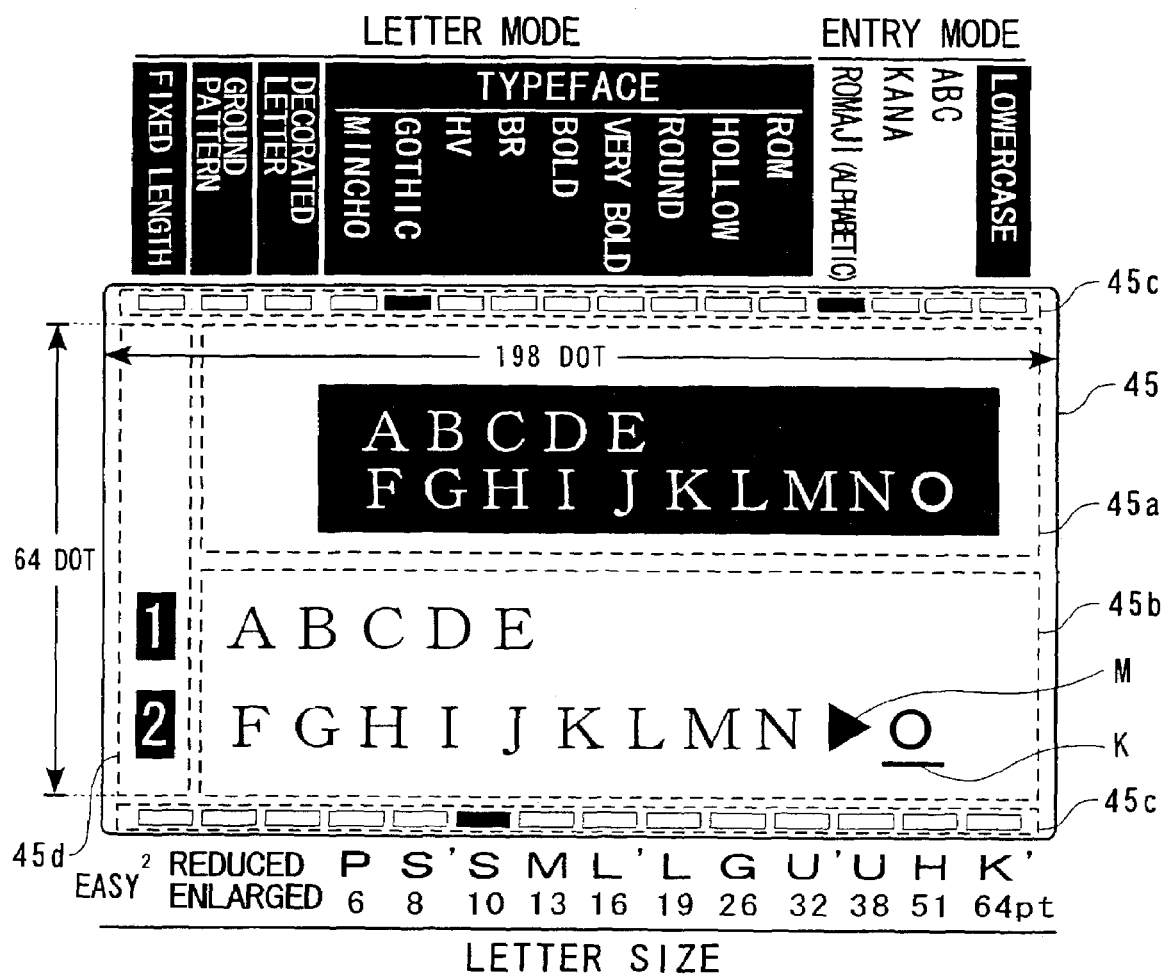
FIG. 5 is an enlarged plan view of a display screen of the FIG. 1 tape printing apparatus.

As shown in FIG. 5, the display screen 45 includes a print image display section 45a for displaying a print image to be printed on a tape and a text display section 45b for displaying an edited state of text. The display screen 45 enables the user to generate/edit print data while viewing the print image display section 45*a*. Further, the display screen 45 has indicator sections 45*c* extending along respective upper and lower perimeters thereof. The indicator sections 45*c* indicate a function currently performed by the tape printing apparatus 1, a letter mode set at an editing object position (i.e. a position to which the cursor K added) of the text, and so forth. The indicator sections 45*c* have indicator elements arranged therein in a manner corresponding to respective letters (symbols) and names each representative of a function or a letter mode, which are printed outside the display screen 45 along the indicator sections 45*c*. Indicator elements in an active state (filled with black in the figure) each indicate that the corresponding function or letter mode is currently set. In the figure, for example, it is indicated that a letter "O" under which the cursor K is placed (to which it is added) has been entered, and a letter size thereof is set to S size (10 point), and Gothic typeface is selected as a letter mode (typeface) (a rightwardly-directed black triangle mark displayed on the left side of the letter "O" is a "letter mode-designating mark"). It should be noted that the indicator sections 45*c* may also have indicator elements indicative of text forms and paragraph styles (described in detail hereinafter). Further, the display screen has a line head mark display section 45*d* arranged at a location leftward of the print image display section 45*a* and the text display section 45*b*. In the line head mark display section 45*d*, line head marks (numerals "1" and "2" in white against black in the illustrated example) are displayed when the number of displayed characters of a line in the text display section 45*b* is equal to or larger than a predetermined number, which will be described in detail hereinafter.

On the keyboard 3, there are arranged a character key group including an alphabet key group, a number key group, and a nonstandard character key group for calling nonstandard characters for selection, as well as a function key group for designating various operation modes. In a type of the apparatus which is capable of entering the Japanese language, the character key group also includes a kana key group for entering Japanese hiragana letters and Japanese katakana letters. The function key group includes a print key for instructing the apparatus 1 to execute printing, a new line start key for instructing the starting of a new line, a selection key for selecting a desired function from displayed menu options (or for selecting a desired kanji letter from candidates kanji letters presented in kana-kanji conversion which is executed by the type of apparatus capable of entering the Japanese language), four cursor keys (up arrow key, down arrow key, left arrow key, and right arrow key) for moving the cursor K indicative of a position at which a character is to be entered next or a position at which operation is carried out, in respective upward, downward, leftward, and rightward directions, and a delete key for deleting characters or canceling operations carried out for various functions. It should be noted that the delete key in the present embodiment has the so-called "BS (backspace)" function for deleting a character displayed immediately before the position of the cursor K, not the "DEL (deletion)" function for deleting a character displayed at or immediately after the position of the cursor K.

The function key group further includes a file/form key for calling a design form, which is a main point of the invention, or registering/calling a file (writing). Similarly to keyboards of the general type, the above key entries may be made by provision of respective keys or by provision of a smaller number of keys which can be operated in combination with a shift key or the like. As shown in FIG. 4, various commands and data are input to the control block 200 via the keyboard 3.

The tape feeder block 120 includes a feed motor 121 for feeding the tape T. The feed motor 121 has an end thereof rigidly fixed to a disc, not shown, formed with detection openings, and a rotational speed sensor 141 including a photo sensor or the like is arranged such that the sensor 141 faces the rotational path of the detection openings, for sending information of the rotational speed of the feed motor 121 detected thereby to the control block 200.

The printer block 12 has the compartment P formed under the lid 5, for receiving the tape cartridge C therein. The tape cartridge C can be mounted in or removed from the compartment P when the lid 5 is open. The tape cartridge C has a cartridge casing 51 holding the tape T and the ink ribbon each having a predetermined width (6 to 36 mm). Further, the tape cartridge C is formed with the through hole 55 for receiving therein a head unit arranged in the compartment P.

The cartridge casing 51 has a plurality of small holes, not shown, formed in the bottom thereof for discrimination of the type of the tape T contained therein from the other types of the tape T having different widths, which are contained in the other types of tape cartridges C. The compartment P has a tape width-detecting sensor 142 comprised of micro-switches or the like, for detecting the above holes to thereby determine the type of the tape T set for use. Further, a barcode tape bearing, as a barcodes, information of the materials, thicknesses, colors, and the like of members forming a tape T accommodated in the cartridge casing 51 is affixed to the bottom surface of the cartridge casing 51. The information encoded as the barcode can be detected by a tape information-detecting sensor 143 implemented by a photo sensor or the like.

The cutter block 13 is comprised of a through-cutting tape cutter 132*a* for cutting through the tape T, a half-cutting tape cutter 132*b* for cutting only the image-receiving layer and adhesive layer of the tape T, through-cutting and half-cutting cutting buttons 133*a*, 133*b* to be manually operated for causing the respective tape cutters 132*a*, 132*b* to cut the tape T e.g. in the case of desired length printing, and a cutter motor 131 for automatically actuating the tape cutters 132*a*, 132*b* to cut the tape T e.g. in the case of fixed length printing.

The tape printing apparatus 1 can be switched between a manual cutting mode and an automatic cutting mode by a cutting mode-setting operation. In the manual cutting mode, after completion of a printing operation, the user pushes the cutting buttons 133*a*, 133*b* arranged on the apparatus casing 4, whereby the tape cutters 132*a*, 132*b* are actuated to cut the tape T to a desired length. On the other hand, in the automatic cutting mode, after completion of a printing operation, the tape T is sent for additional feed by the length of a trailing margin, and then stopped, whereupon the cutter motor 131 is driven for cutting the tape T. It should be noted that in the automatic cutting mode, when the apparatus 1 has been set to perform half-cutting, the half-cutting tape cutter 132*b* is driven, whereas when no particular cutting method is designated, the through-cutting tape cutter 132*a* is driven.

When the automatic cutting mode is set according to the mode-setting operation, the type of the tape T is detected by the tape information-detecting sensor 143, and based on a result of the detection, whether or not the cutter motor 131 should be driven is set. More specifically, whether or not both through-cutting and half-cutting should be carried out is set based on a result of the detection.

The sensor block 15 includes the rotational speed sensor 141, the tape width-detecting sensor 142, and the tape information-detecting sensor 143. It should be noted that, to suit the actual requirements of the tape printing apparatus 1, it is possible to omit these sensors.

The driver block 270 is comprised of a display driver 271, a head driver 272, and a motor driver 273. The display driver 271 drives the display 14 of the operating block 11 in response to control signals delivered from the control block 200, i.e. in accordance with commands therefrom. Similarly, the head driver 272 drives the print head 122 of the printer block 12, in accordance with commands from the control block 200. The motor driver 273 includes a feed motor driver 273d for driving the feed motor 121 of the printer block 12, and a cutter motor driver 273c for driving the cutter motor 131 of the cutter block 13. Similarly to the above drivers, the motor driver 273 drives each motor in accordance with commands from the control block 200.

The control block 200 includes a CPU 210, a ROM 220, a character generator ROM (CG-ROM) 230, a RAM 240 and a peripheral control circuit (P-CON) 250, all of which are connected to each other by an internal bus 260. The ROM 220 has a control program area 221 for storing control programs executed by the CPU 210 as well as a control data area 222 for storing control data including a character table, a design form table, a color conversion table and a letter modification table. The CG-ROM 230 stores bitmap data of symbols, figures and the like, which is provided for the tape printing apparatus 1. When code data specifying a character or the like is input thereto, it outputs the corresponding bitmap data.

The RAM (storage device) 240 is supplied with power by a backup circuit, not shown, such that stored data items can be preserved even when the power is turned off by operating the power key 17. The RAM 240 includes areas of a register group 241, a character data area 242 for storing character data of letters or the like entered by the user via the keyboard 3, a display image data area 243 for storing image data displayed on the display screen 45, a print image data area 244 for storing print image data, a registered image data area 245 for storing registered image data, as well as a print history data area 246 and a conversion buffer area 247 including color conversion buffers. The RAM 240 is used as a work area for carrying out various control processes.

The P-CON 250 incorporates logic circuits for complementing the functions of the CPU 210 and for dealing with interface signals for interfacing between the CPU 210 and peripheral circuits. The logic circuits are implemented by gate arrays, a custom LSI and the like. For instance, a timer 251 is incorporated in the P-CON 250 for the function of measuring elapsed time. The P-CON 250 is connected to the sensors of the sensor block 15 and the keyboard 3, for receiving the above-mentioned signals generated by the sensor block 15 as well as commands and data entered via the keyboard 3, and inputting these to the internal bus 260 directly or after processing them. Further, the P-CON 250 cooperates with the CPU 210 to output data and control signals input to the internal bus 260 by the CPU 210 or the like, to the driver block 270 directly or after processing them.

The CPU 210 receives the signals from the sensor block 15, the commands and data input via the keyboard 3, etc. via the P-CON 250, according to the control programs read from the ROM 220, processes bitmap data from the CG-ROM 230 and various data stored in the RAM 240, and delivers control signals to the driver block 270 via the P-CON 250 to thereby carry out position control during printing operations, display control of the display screen 45, etc. Further, the CPU 210 causes the print head 122 to carry out printing on the tape T under predetermined printing conditions. In short, the CPU 210 controls the overall operation of the tape printing apparatus 1.

Now, the character input method carried out by the tape printing apparatus 1 will be described. As described hereinbefore, the tape printing apparatus 1 of the invention is capable of easily producing a nice-looking label suitable for an intended use by calling a design form having a sample text input therein in advance and then editing the contents of the sample text.

Figure 7:
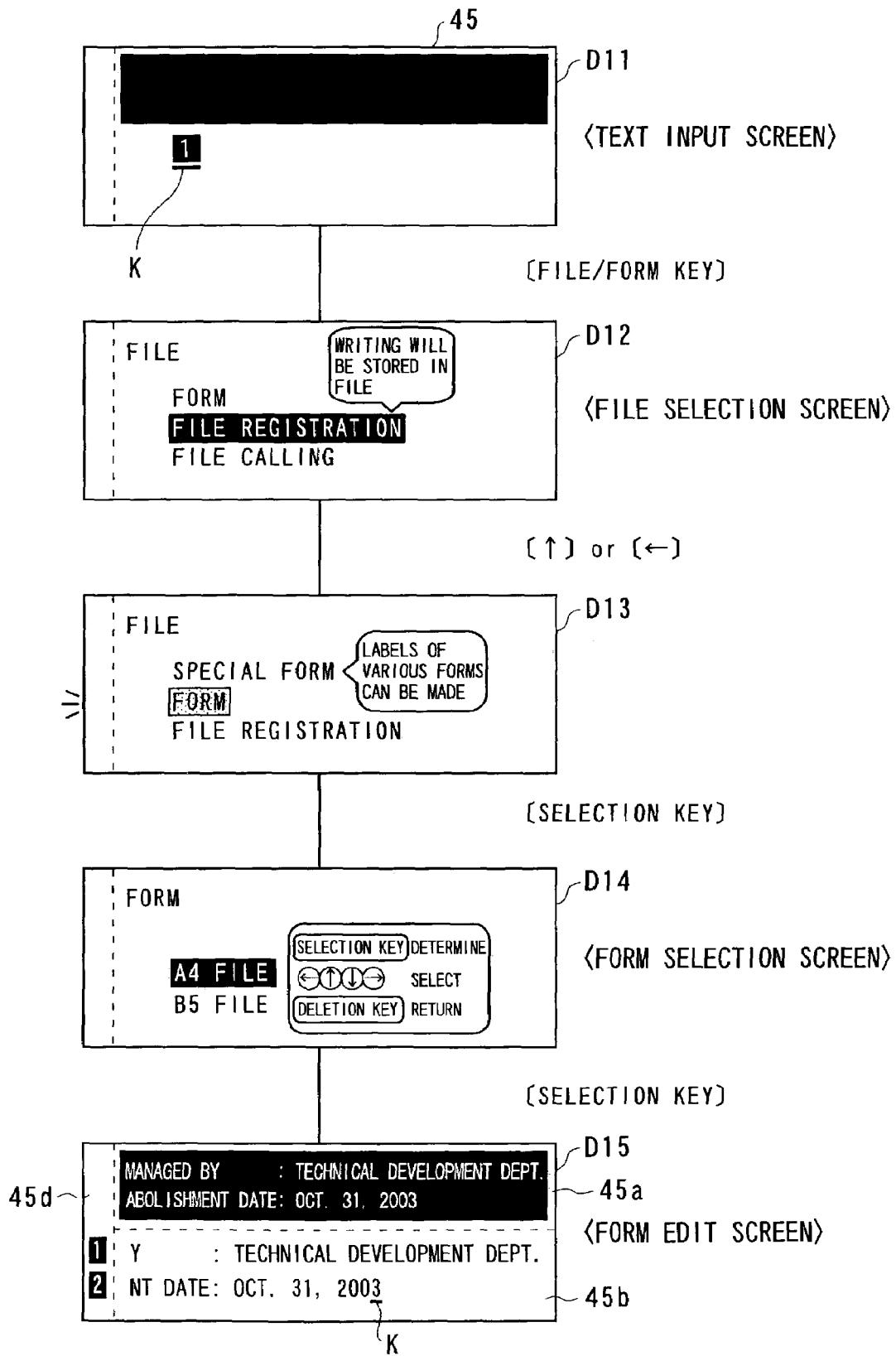
FIG. 7 is a diagram which is useful in explaining a process of calling the FIG. 6 design form, and illustrates images displayed on a display screen.

Therefore, a case of making a FIG. 10 label by calling a design form (for a spine label to be affixed to the spine of an A4 file folder) having a sample text, shown in FIG. 6A, input therein in advance, and then editing the contents of the sample text will be described as a first example. As shown in FIG. 7, when the file/form key is depressed by the user in a state of a text entry screen being displayed (D11), the screen is switched to a file selection screen (D12). In an upper area of this screen, a word "file" is displayed for showing that the file selection screen is currently displayed, and further, menu options "form (a menu option selected for selecting a desired design form from a plurality of design forms)", "file registration" and "file calling" are also displayed on the screen. The menu option "file registration" set to a default value is displayed in reverse video. Further, a note explaining the menu option displayed in reverse video is displayed in a manner surrounded by a balloon ("Writing will be stored in file"). This note displayed on the display screen 45, for explaining the menu option enables even a beginner to operate the apparatus 1 with ease without consulting an instruction manual.

Further, on the "file selection screen", a menu option "special form" can also be selected. When the screen is switched to the "file selection screen", this menu option "special form" is not displayed because the size of the display screen 45 is limited, and hence the menu option is displayed by depressing the up arrow key or the left arrow key (see D13) The "special form" is an option representative of the function of making a specially designed label, such as an index label, and the "form" is an option representative of making a nice-looking label suitable for an intended use by entering characters, such as letters, symbols, and the like (both of which will be described in detail hereinafter). Further, the "file registration" and the "file calling" are respective options representative of the functions of registering and calling a file (writing) originally prepared by the user.

If the up arrow key or the left arrow key is depressed by the user in the state of D12, the menu option "form" is displayed in a shaded manner, and a note explaining the menu option is displayed in a manner surrounded by a balloon (D13). Then, when the selection key is depressed, the screen is switched to the "form selection screen" (D14). The "form selection screen" is provided with menu options "A4 file (see FIGS. 6A to 6D)", "B5 file", "fixture management slip (see FIGS. 12A to 12D)", "VHS/horizontal (see FIG. 18A)", "8 mm video (see FIG. 18B)", "mini-DV (see FIG. 19A)" and "DAT (see FIG. 19B)", and others for selecting design forms designed for various applications. Among these menu options, the option "A4 file" set to a default value is displayed in reverse video. Further, on the "form selection screen", notes explaining keys operable in this state (e.g. the selection key, the cursor keys, the deletion key, etc.) are displayed, each of which, similarly to the above-mentioned note surrounded by the balloon, enables even a beginner to operate the apparatus 1 with ease without consulting the instruction manual.

If the selection key is depressed by the user in the state of D14, the screen is switched to a "form edit screen", where an "A4 file" design form and a sample text input therein in advance are displayed (D15). At this time point, the cursor K is placed at the end (under the last character of the last line) of the sample text. Further, as shown in the figure, the "form edit screen" has an upper area thereof defined as the print image display section 45a in which a print image is displayed, and a lower area thereof defined as the text display section 45b. In the following, for purposes of ease of understanding, the print image display section 45a and the text display section 45b are shown in the figure in a manner separated from each other by a broken line, and the line head mark display section 45d (left-side area as viewed in the figure) in which a line head mark is displayed whenever the number of displayed characters of a line exceeds eleven is also separated from the other sections 45a, 45b by a broken line. It should be noted that these broken lines are not displayed on the actual screen (see FIG. 5). The indicator sections 45c (see FIG. 5) extending along the respective upper and lower perimeters of the display screen 45 are not shown here.

Next, a process of editing a sample text will be described. FIG. 6 shows the design form in which the unedited sample text for an "A4 file", which is described as the first example, has been input. Printing of the design form having the sample text input therein can be performed by depressing the print key in the state of D15 in FIG. 7. That is, by depressing the print key immediately after having called a desired design form and before editing the same, it is possible to carry out "sample printing" for printing the design form having a sample text input therein on a tape T. Therefore, the user can confirm the printing form of the design form without consulting an instruction manual or the like.

Each sample text is pre-formatted as required. The "format" includes various categories, which are basically classified into "text form", "paragraph style" and "letter mode" as shown in detail in FIGS. 15 to 17. The figures illustrate lists of menu options selectable in the respective categories, and an initially set value (default value) in each option group is shown in a shaded manner. It should be noted that not all the stored sample texts are wholly formatted in the above three categories of the format, but some sample texts are formatted partially (on a paragraph-by-paragraph basis and/or a character string-by-character string basis) as required. In consideration of this point, the following description is made by referring to the example shown in FIGS. 6A to 6D.

The design form shown in the figures has the entire sample text thereof formatted in the "text form" and the "letter mode", and the details thereof are shown in "form information" of FIG. 6B. As shown in the "form information", the design form is specifically designed for an "A4 file", and options "fixed length printing: layout (20 cm)" and "margin: automatic/short" are designated for the "text form" (see S11, S12 in FIG. 15). The "fixed length printing" represents the function of making a tape strip T having a predetermined length (in the present example, 20 cm, which is a length corresponding to the length of the spine of an "A4 file" folder). The "layout" represents the function of laying out characters uniformly on the tape strip T according to the number of the characters. Further, the "margin" represents the function of setting the lengths of respective blank portions in the leading and trailing end portions of the tape strip T, while the "automatic/short" represents the function of setting margin lengths reduced according to a tape width, in place of fixed margin lengths.

In the example shown in FIGS. 6A to 6D, no option is designated for "paragraph style for entire text". This is because paragraph styles are set on a paragraph-by-paragraph basis. For "letter mode for entire text", options "vertical/horizontal: vertical writing" and "typeface: Japanese; Gothic typeface, alphanumerics; automatic" are designated (see S13, S14, S15 in FIG. 17). Thus, "typeface" is divided into "Japanese typeface" and "alphanumeric typeface", and setting is made in each of the categories. The option "alphanumerics; automatic" indicates that the same kind of typeface that is set as a "Japanese typeface" ("Gothic typeface" in the present example) is automatically set for alphanumerics.

The design form in the example has the sample text formed of two paragraphs (hereinafter referred to as "paragraph 1" and "paragraph 2", respectively), and further, the "paragraph 2" is formed of two character strings ("managed by: . . ." and "abolishment date: . . ."). As shown in "paragraph information" of FIG. 6C, an option "letter size: one line/large 1d" is designated for "paragraph style" for the "paragraph 1" (see S16 in FIG. 16). The option "one line/large 1d" is selected from various combinations of the numbers of lines and letter sizes stored in advance, and the print image thereof is shown in S16 in FIG. 16.

Similarly, as shown in "paragraph information" of FIG. 6D, options "letter size: two lines/middle/middle 2b" and "outer frame/tabular format: outer frame; 03" are designated for a paragraph style for the "paragraph 2" (see S17, S18 in FIG. 16). The option "outer frame; 03" represents a number assigned to an outer frame design stored in advance, and the image of the outer frame design is shown in S18 in FIG. 16. Further, "repetitive text" is set for the "paragraph 2". In the present example, the "repetitive text" is formed of two character strings ("1. managed by:" and "2. abolishment date:"). A "repetitive text" is set according to a use of each design form, as a text which can be used without being edited (rewritten), and hence the "repetitive text" is different from the other kinds of character strings in that it cannot be edited. However, it is possible to configure a "repetitive text" as an editable one. This method will be described hereinafter by giving a second example.

Next, a process of preparing an original text by editing the above sample text will be described with reference to FIGS. 8 and 9. Immediately after the "A4 file" design form and the sample text input therein are displayed, the cursor K is added to (placed under, in the present embodiment) the last character of the sample text (D17). Further, as described above, although the "A4 file" sample text is formed of the two paragraphs and at the same time the three character strings, only the two character strings of the "paragraph 2" are displayed on the screen. This is because the text display section 45b of the display screen 45 has a limited display area in which only two character strings can be displayed. Therefore, it is required to depress the up arrow key or the left arrow key so as to display the character string of the "paragraph 1" (see D23 in FIG. 9). Line head marks displayed in the line head mark display section 45d are each indicative of a character string number added to each paragraph.

The reason why the leading half portions ("1. managed)" and "2. abolishment") of the respective two character strings of the "paragraph 2" are not displayed in the text display section 45b is that the display area of the text display section 45b is not large enough for displaying more than predetermined full-size (em-size) characters. More specifically, when the last line of a sample text of a design form called onto an initial screen includes more than allocatable characters ("e.g. abolishment date: Oct. 31, 2003") as shown in FIG. 11A, the last eleven characters of the character string of the last line and a space for one character are displayed (numerals in the example are all entered in half size (en-size)). When the last line of a sample text includes allocatable characters (e.g. "abolishment date: permanent storage edition") as shown in FIG. 11B, the entire character string and a space for one character are displayed in the text display section 45b. Further, when the last line of a sample text includes allocatable characters (e.g. "abolishment date: permanent storage") as shown in FIG. 11C, line head marks are displayed not in the line head mark display section 45d, but in the first column of the text display section 45b, and the entire character string is displayed. Moreover, when the last line of a sample text includes fewer than ten characters (e.g. "abolishment prohibited") as shown in FIG. 11D, line head marks are displayed not in the line head mark display section 45d, but in the second column of the text display section 45b, and the entire character string is displayed.

In the above method, since the display pattern is changed according to the number of characters forming the last line of a sample text, the user can not only view and confirm the screen easily, but also readily locate an editing start position (i.e. the position of the cursor K), which makes it possible to enhance operability of the apparatus. It should be noted that the display position of the first line of character strings displayed in the text display section 45b changes in accordance with a shift of the display position of the last line (second line) of the character strings.

Figure 8:
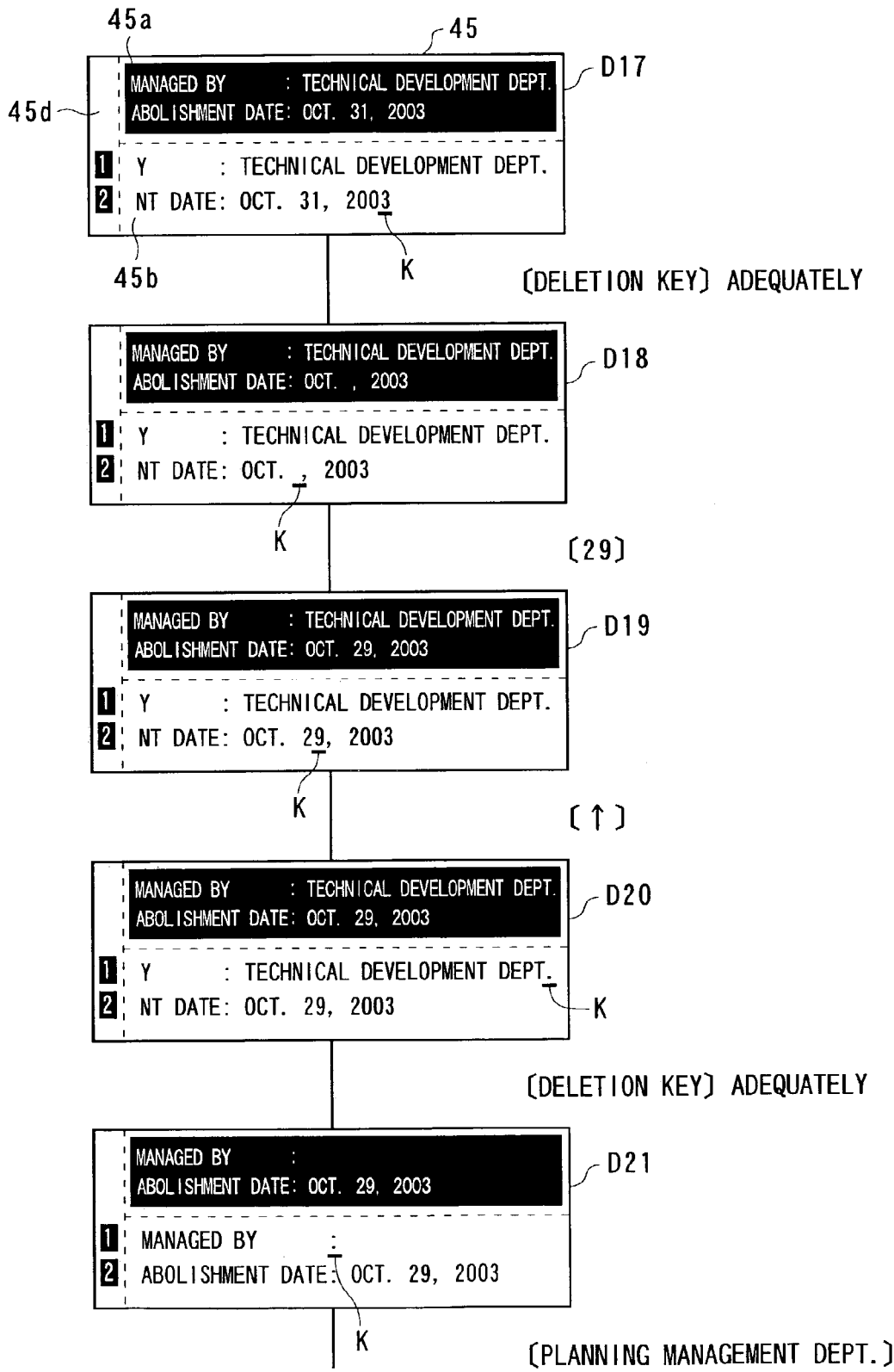
FIG. 8 is a diagram which is useful in explaining a process of editing a sample text input in the FIG. 6 design form, and illustrates images displayed on the display screen.
Figure 9:
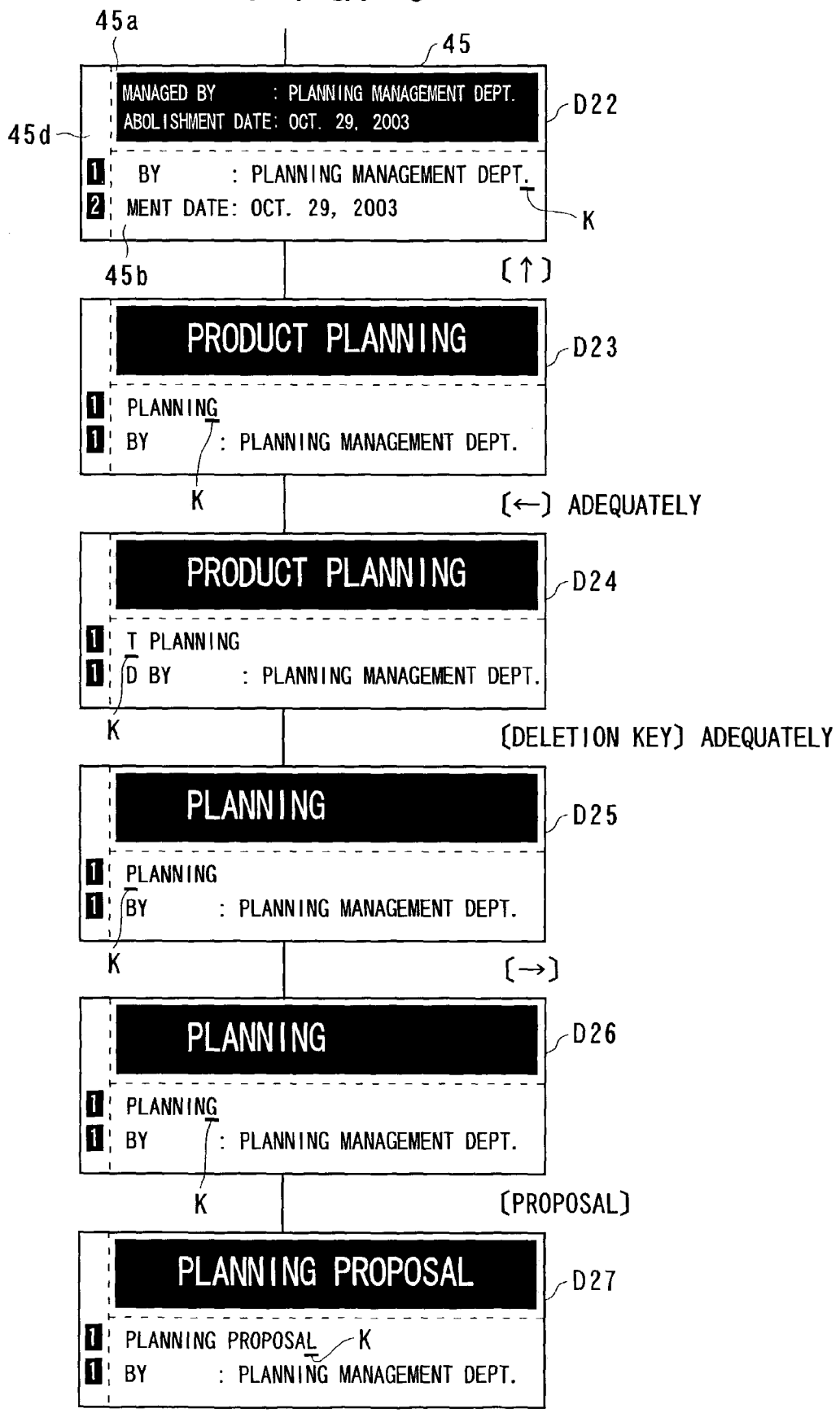
FIG. 9 is a continuation of the FIG. 8 diagram.

Now, when the delete key is depressed in an adequate manner in the state of D17 in FIG. 8, characters "31 日" (31 in half-size) are deleted, and the position of the cursor K is shifted (D18). Then, characters "29" (29 in half-size) are entered by depressing the corresponding letter keys, whereby editing of the last line of the "paragraph 2" is completed (D19: see Edit (1) in FIG. 10). Needless to say, as shown by D18 and D19 in FIG. 8, display in the print image display section 45a changes in accordance with editing in the text display section 45b.

Figure 10:
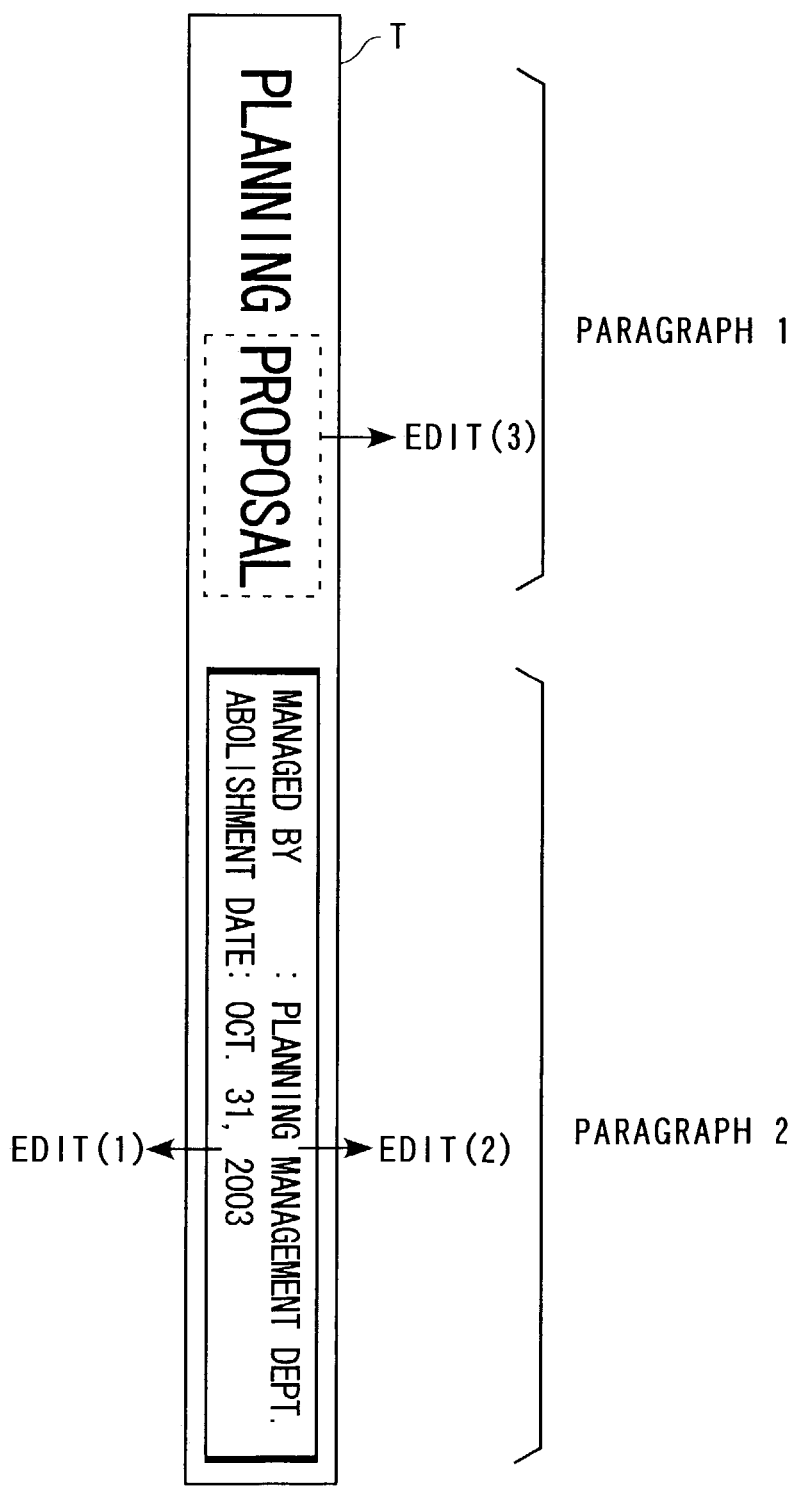
FIG. 10 is a diagram useful in explaining an example of the design form (after editing) according to the first example of the invention.

As the number of characters entered for editing is larger, the area of the "paragraph 2" shown in FIG. 10 becomes longer. However, entry of a character string having a length longer than a predetermined range (e.g. 10 cm) or characters of a number exceeding a predetermined number (30 characters) is disabled. This is because the length of the "A4 file" design form is set to a fixed length (20 cm). This rule is applied to entry of any other character string. According to this method, it is possible to prevent the user from carrying out useless character input. In this case, a function of error notification may be provided so as to notify the user of the fact that character input was disabled. This makes the user clearly aware that useless character input is being performed. For error notification, a warning sentence (e.g. "No more entry permitted") may be displayed on the display screen 45, or the display screen 45 may be temporarily inhibited from displaying any image. Alternatively, warning beeps may be used.

Then, when the up arrow key is depressed in the state of D19 in FIG. 8, the screen enters a state ready for editing of the first line of the character strings of the "paragraph 2", with the cursor K added to the last character of the first line (D20). When the delete key is depressed five times in this state, characters "Technical Development Department" are deleted, and the position of the cursor K is shifted (D21). Further, when characters "Planning Management Department" are entered, editing of the first line of the character strings of the "paragraph 2" is completed as shown by D22 in FIG. 9 (see Edit (2) in FIG. 10).

Then, when the up arrow key is depressed, the screen enters a state ready for editing of the character string of the "paragraph 1" (D23). In this case, the last line of the edited "paragraph 2" is not displayed because the display area of the text display section 45b is limited. Further, since the "paragraph 1" is formed of the single character string as described above, numeral "1" is placed at the head of the character string as a line head mark. In the present case as well, the cursor K is added to the last character of the character string. When the left arrow key is depressed adequately (or adequate times) in the state of D23, the position of the cursor K is shifted (D24), and further, when the delete key is depressed adequately, characters "product" (D25) are deleted. Then, the right arrow key is depressed in this state (D26), and characters "proposal" are entered by depressing the corresponding letter keys, whereby the editing of the "paragraph 1" is completed (D27: see Edit (3) in FIG. 10). As described above, it is possible to rewrite portions of a sample text input in advance as required, while utilizing the contents thereof, so that an original text as an intended document can be prepared speedily. Although in the above example, as shown e.g. by D23 and D24, display in the print image display section 45a does not change even when the cursor position is shifted, it is also possible to configure the apparatus such that the display range of a print image is shifted in accordance with a shift of the cursor position.

Thus, the entire editing process (Edits (1) to (3)) is completed. Then, by depressing the print key in the state of D27 in FIG. 9, it is possible to make an original label for an "A4 file" folder.

Next, a process of editing a sample text input in a design form in advance, shown in FIG. 12A, for a "fixture management slip" will be described as the second example. The present example is distinguished from the first one in which the design form for an "A4 file" is edited, in that the size of a label to be made is not fixed (tape length is arbitrary) and that "repetitive text" stored in advance is editable. Therefore, the following description will be made basically of differences from the first example.

In the design form of the second example, the sample text input therein is also wholly formatted. As shown in "form information" of FIG. 12B, this design form is designed for a "fixture management slip", and an option "margin: automatic/short" is designated for "text form" (see S20 in FIG. 15). Further, options "letter size: automatic/uniform", "layout: forward alignment" and "outer frame/tabular format: tabular format; 03" are designated for "paragraph style for entire text" (see S21, S22, S23 in FIG. 16). The "letter size: automatic/uniform" is a function of setting an identical letter size for all lines, and the "layout: forward alignment" represents the function of setting the positions of respective character strings of all the lines such that they are aligned at forward ends. Further, options "vertical/horizontal: horizontal writing" and "typeface: Japanese; Bold-Mincho typeface, alphanumerics; automatic" are designated for "letter mode for entire writing" (see S24, S25, S26 in FIG. 17).

The sample text of this design form is formed of two paragraphs (hereinafter referred to as the "paragraph 1" and the "paragraph 2", respectively). Further, each of the paragraphs is formed of four character strings. As shown in "paragraph information" of FIG. 12C, "layout: layout" is designated for "paragraph style" for the "paragraph 1" (see S27 in FIG. 16).

Further, the four character strings of the "paragraph 1" are each set as a "repetitive text", and the option "typeface: Japanese; Gothic typeface, alphanumerics; automatic" is designated for "letter mode" for each of the character strings (S28, S29 in FIG. 17). When a letter mode set for a character string of the "paragraph 1" is different from a predetermined letter mode set in the "paragraph information" as shown in the present example, a "letter mode-designating mark M" is added to the head of the character string on the display screen 45, so that the user can confirm by viewing the display screen 45 that a special format (i.e. a format other than a predetermined format) is set for the character string.

Further, the "repetitive text" can be edited (rewritten) as required. Therefore, the "repetitive text" may be stored as a normal sample text without being discriminated from other character strings. It should be noted that when two different formats are set, respectively, in the "form information" and the "paragraph information" as described above, the "paragraph information" has precedence over the "form information".

On the other hand, as shown in FIG. 12D, the "paragraph 2" has no "paragraph information" set therefor. This means that the "paragraph 2" is formatted in accordance with the "form information" shown in FIG. 12B.

Figure 13:
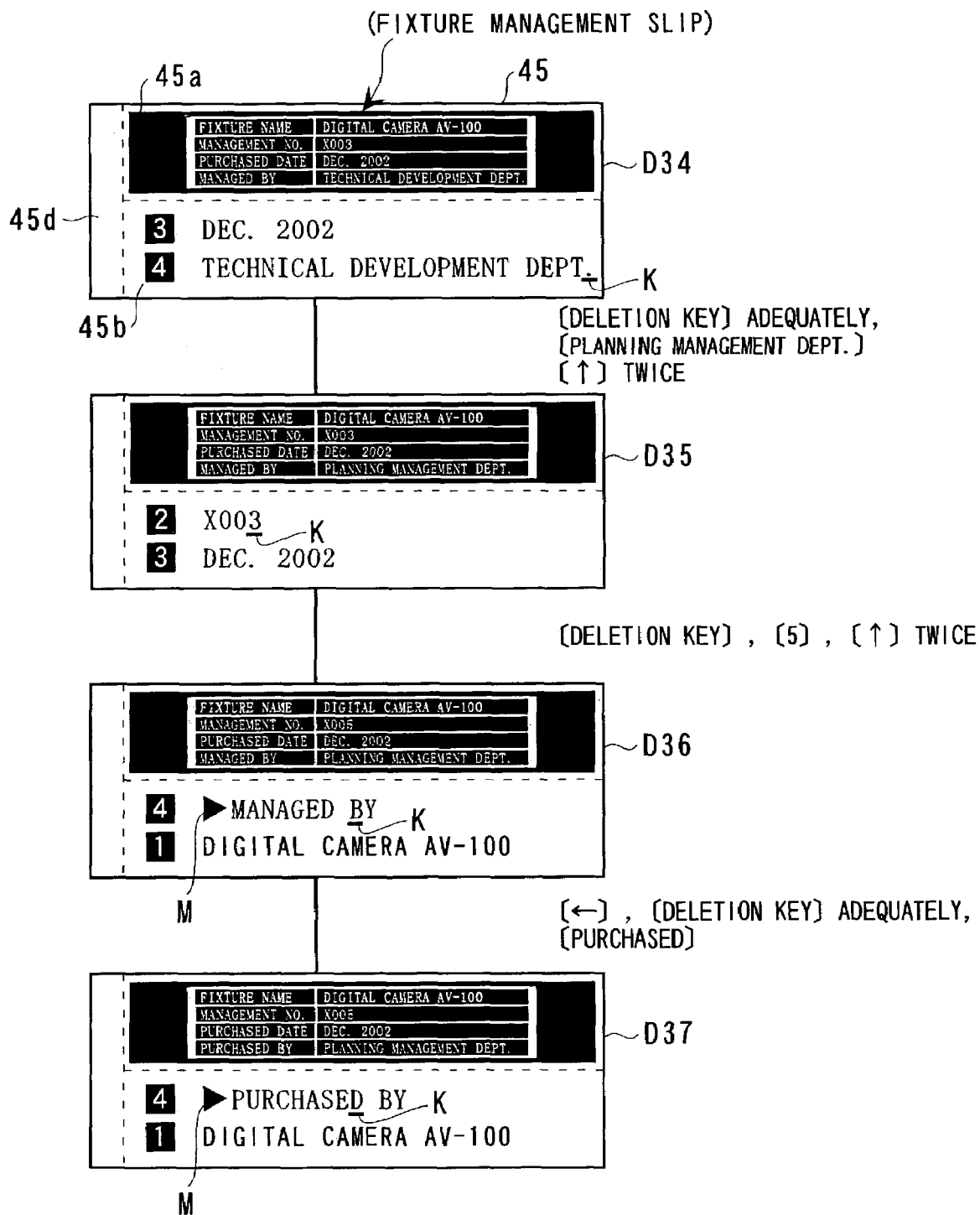
FIG. 13 is a diagram which is useful in explaining a process of editing a sample text input in the FIG. 12 design form, and illustrates images displayed on the display screen.
Figure 20A:
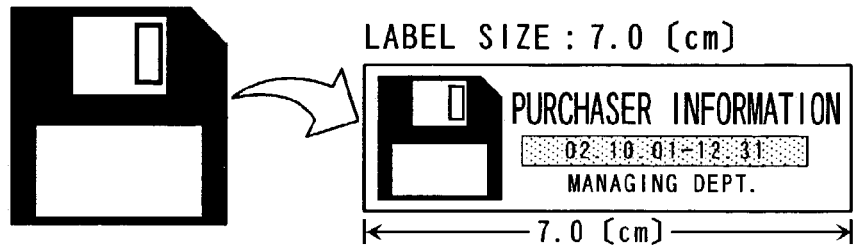
FIGS. 20A to 20D are diagrams useful in explaining the prior art.
Figure 20B:
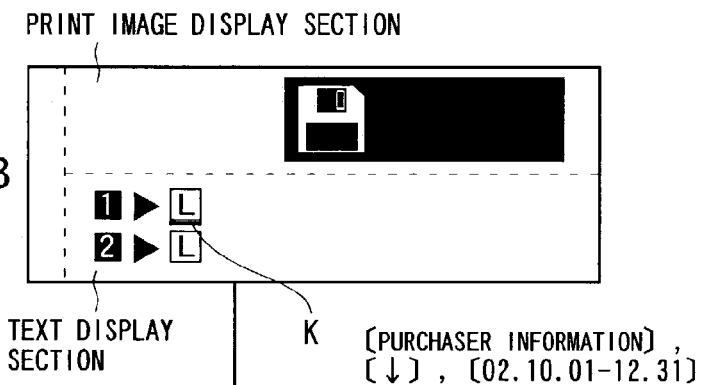
Figure 20C:
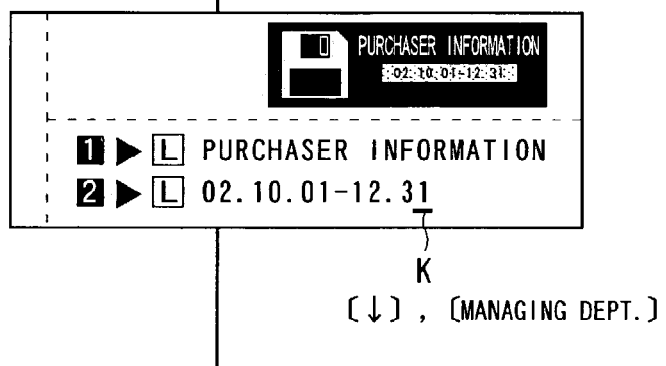
Figure 20D:
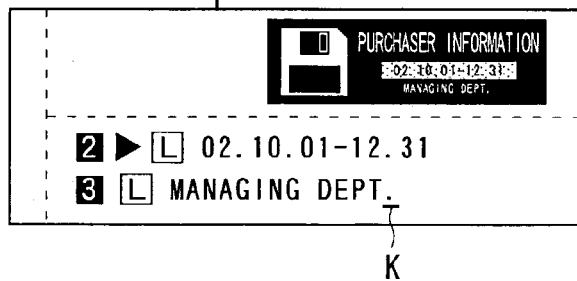

Next, a process of preparing an original text by editing the above sample text will be described with reference to FIG. 13. When the design form for a "fixture management slip" and the sample text input therein are displayed first, the last two character strings of the "paragraph 2" are displayed in the text display section 45*b* with the cursor K placed at the end of the last character string (D34). In this state, the delete key is depressed five times, and further, characters "Planning Management Department" are entered by depressing the corresponding letter keys, whereby editing of the last line of the second paragraph is completed (see Edit (1) in FIG. 14). Then, when the up arrow key is depressed twice, the screen enters a state ready for editing of the second character string of the "paragraph 2" (D35). In this state, the delete key is depressed, and further, a character "5" is entered by depressing the corresponding letter key, whereby editing of the second line of the second paragraph is completed (see Edit (2) in FIG. 14). Then, when the up arrow key is depressed twice, editing of the fourth character string of the "paragraph 1" is allowed (D36). Although the character strings of the "paragraph 1" are all set as "repetitive texts" as described hereinabove, they can be edited similarly to the other character strings. Therefore, the left arrow key and the delete key are each depressed twice, and then characters "purchased" are entered by depressing the corresponding letter keys, whereby the editing of the fourth character string of the "paragraph 1" is completed (D37: see Edit (3) in FIG. 14).

Thus, the entire editing process (Edits (1) to (3)) is completed. Then, by depressing the print key in the state of D37 in FIG. 13, whereby it is possible to make an original label for use as an "fixture management slip". It should be noted that since the size of this "fixture management slip" is not fixed, the number of letters to be entered is not limited. Therefore, even when numerous letters are entered, entry is not disabled. More specifically, the "paragraph 1" and/or the "paragraph 2" can be extended according to an increased number of entered letters. However, if the number of letters that can be entered in one line is limited in the tape printing apparatus 1, the lengths of the respective paragraphs are also limited.

In the following, a description will be given of other kinds of design forms. Four examples are illustrated in FIGS. 18A, 18B and 19A, 19B, respectively. Each of the figures shows an example of a design form ("label to be produced") having a sample text input therein, an example of the contents ("test contents") of the sample text, and an example of an initial screen ("initial screen") displayed when the design form is called. The "labels to be produced" are each shown on a scale different from an actual size thereof (see a tape width thereof), and some are enlarged as required. As shown in the figures, it is possible to enter a pictorial symbol as a character string as well as to replace the pictorial symbol with another one or a sheer symbol. On each of the initial screens, the cursor K is added to the last character of the last line of a sample text. The display pattern on the initial screen varies with the number of characters in the last line of each sample text (see FIG. 11). Further, the image of each design form to be printed on a tape T is displayed in the print image display section 45*a*, so that the user can confirm the printing form not by consulting an instruction manual, but by viewing the display screen 45.

As described above, according to the character input apparatus and the tape printing apparatus incorporating the same as well as the character input method, of the present invention, since it is possible to select one design form from a plurality of stored ones, the user can easily prepare a document suitable for an intended use. Further, since each design form has a sample text input therein in advance, and the sample text is editable, the user can grasp what characters to enter and where to enter these and then edit the sample text. Moreover, it is only required to edit one or more portions of the sample text input in advance, which need rewriting and/or complementing, and hence an intended document can be prepared with ease.

Further, in an initial state before editing, the cursor K is added to the last character of a sample text, so that the user can immediately confirm a portion to be edited and speedily carry out deleting operations on the sample text input in advance. More specifically, without using both the BS (backspace) function for deleting a character immediately before a character under which the cursor K is placed and the DEL (deletion) function for deleting a character on or immediately after the cursor K, deleting operations can be speedily carried out only by the BS function. As a result, the apparatus is not required to be equipped with the DEL function for deleting operations, which makes it possible to simplify the control system of the apparatus.

Further, each sample text is pre-formatted ("form information" and/or "paragraph information) as a whole or on a paragraph-by-paragraph basis, and hence the form of entered characters is determined in accordance with the format of the whole of a sample text to be edited or a paragraph to be edited, which enables the user to prepare a nice-looking document without any need to carry out troublesome operations for formatting.

Although in the above embodiment, a format (including a "text form", a "paragraph style" and a "letter mode") is set according to "form information" set for the entire sample text and "paragraph information" set for each paragraph (see FIGS. 6A to 6D and 12A to 12D), only one of "form information" and "paragraph information" may be provided for formatting. Further, formatting may be performed based on "character string information" set for each character string, as well as "form information" and "paragraph information", or alternatively, based on "character string information" alone. Thus, it is possible to change the way of formatting according to a memory capacity for storing various formats or a label form.

Further, although in the above embodiment, the width of each tape T to be used is not specified, since some design forms correspond exclusively to certain pre-set label sizes (tape lengths), it is preferred that a tape width is recommended for each design form (e.g. 12 mm for a label for an "A4 file" folder, 18 mm or 24 mm for a label for use as a "fixture management slip", and so forth) More preferably, the recommended tape widths are not only listed in an instruction manual, but also each of them is displayed on the display screen 45. According to this configuration, the user can know which tape width can make a desired label look nice.

Although in the above embodiment, the character input method of the invention is applied to a tape printing apparatus, this is not limitative, but the method is also applicable to other kinds of printing apparatuses and character input apparatus (such as a word processor).

It is further understood by those skilled in the art that the foregoing are preferred embodiments of the invention, and that various changes and modifications may be made without departing from the spirit and scope thereof.

What is claimed is:

1. A character input apparatus comprising:
   storage means for storing a plurality of design forms in each of which a sample text formed of one or more character strings has been input in advance;
   selection means for selecting one design form from the plurality of design forms stored in said storage means;
   edit means for editing the sample text of the one design form selected by said selection means; and
   display means for displaying the sample text of the one design form selected by said selection means or the edited sample text on a screen, and at the same time also displaying a cursor in a manner added to a character to be edited;
   wherein said display means displays the cursor in a manner added to a last character in an initial state displaying the sample text, in which a display pattern on the screen is changed according to the number of characters of the character string forming a last line of the sample text so as to display the last character of the character string of the last line on the screen, before editing by said edit means; and
   wherein said edit means is capable of editing the sample text only by using a backspace function for deleting a character immediately before a character under which the cursor is placed without using a deletion function for deleting a character positioned immediately after the character to which the cursor is added.

2. A character input apparatus according to claim 1, wherein each sample text has a format set thereto, and
   wherein a character input for editing by said edit means has a form thereof determined in accordance with the format of the sample text.

3. A character input apparatus according to claim 1, wherein the sample text includes paragraphs each formed of one or more of the character strings, each of the paragraphs having a format set thereto, and
   a character input for editing by said edit means has a form thereof determined in accordance with the format of the paragraph to be edited.

4. A character input apparatus according to claim 1, wherein each character string has a format set thereto, and
   wherein a character input for editing by said edit means has a form thereof determined in accordance with the format of the character string to be edited.

5. A character input apparatus according to any one of claims 2, 3 or 4, wherein when a format other than a predetermined format is set for any one of the character strings, said display means displays a predetermined mark at a head of the character string having the format other than the predetermined format.

6. A character input apparatus according to claim 5, wherein said display means displays information of a format of a character string including the character to which the cursor is added.

7. A character input apparatus according to claim 6, further comprising indicators for indicating the information of the format.

8. A character input apparatus according to claim 7, further comprising input-disabling means for disabling inputting of a character beyond a character area set for each character string for allowing characters to be input thereto.

9. A character input apparatus according to claim 8, further comprising error notification means for executing error notification when inputting of a character is disabled by said input-disabling means.

10. A tape printing apparatus comprising:
    a character input apparatus including:
    storage means for storing a plurality of design forms in each of which a sample text formed of one or more character strings has been input in advance,
    selection means for selecting one design form from the plurality of design forms stored in said storage means,
    edit means for editing the sample text of the one design form selected by said selection means, and
    display means for displaying the sample text of the one design form selected by said selection means or the edited sample text on a screen, and at the same time also displaying a cursor in a manner added to a character to be edited,
    said display means displaying the cursor in a manner added to a last character in an initial state displaying the sample text, in which a display pattern on the screen is changed according to the number of characters of the character string forming a last line of the sample text so as to display the last character of the character string of the last line on the screen, before editing by said edit means; and
    printing means for printing on a tape a design form to which an original text prepared by editing the sample text by said edit means has been input.

11. A tape printing apparatus according to claim 10, wherein said printing means is capable of sample printing for printing the design form to which the sample text before editing has been input, on the tape.

12. A tape printing apparatus according to claim 10, wherein said display means is capable of print image display for displaying an image of the design form to be printed by said printing means.

13. A tape printing apparatus according to claim 12, wherein said display means includes a print image display section for the print image display and a text display section for displaying an edited state of the sample text.

14. A character input method comprising the steps of:
    storing a plurality of design forms in each of which a sample text formed of one or more character strings has been input in advance;
    selecting one design form from the plurality of design forms stored in the storing step;
    editing the sample text of the one design form selected in the selecting step; and
    displaying the sample text of the one design form selected in the selecting step or the edited sample text on a screen, and at the same time also displaying a cursor in a manner added to a character to be edited;
    wherein the displaying step includes displaying the cursor in a manner added to a last character in an initial state displaying the sample text, in which a display pattern on the screen is changed according to the number of characters of the character string forming a last line of the sample text so as to display the last character of the character string of the last line on the screen, before editing in the editing step; and
    wherein the editing step is capable of editing the sample text only by using a backspace function for deleting a character immediately before a character under which the cursor is placed without using a deletion function for deleting a character positioned immediately after the character to which the cursor is added.

15. A character input method according to claim 14, wherein each sample text has a format set thereto, and
    wherein a character input for editing in the editing step has a form thereof determined in accordance with the format of the sample text.

16. A character input method according to claim 14, wherein the sample text includes paragraphs each formed of one or more of the character strings, each of the paragraphs having a format set thereto, and a character input for editing in the editing step has a form thereof determined in accordance with the format of the paragraph to be edited.

17. A character input method according to claim 14, wherein each character string has a format set thereto, and wherein a character input for editing in the editing step has a form thereof determined in accordance with the format of the character string to be edited.

18. A character input method according to any one of claims 15 to 17, wherein when a format other than a predetermined format is set for any one of the character strings, the editing step includes displaying a predetermined mark at a head of the character string having the format other than the predetermined format.

19. A character input method according to claim 18, wherein the displaying step includes displaying information of a format of a character string including the character to which the cursor is added.

20. A character input method according to claim 19, wherein the information of the format is indicated by indicators.

\* \* \* \* \*